US007752098B2

(12) United States Patent  
Matsutani

(10) Patent No.: US 7,752,098 B2
(45) Date of Patent: Jul. 6, 2010

(54) INFORMATION TERMINAL APPARATUS

(75) Inventor: Kiyoshi Matsutani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 2849 days.

(21) Appl. No.: 09/839,495

(22) Filed: Apr. 23, 2001

(65) Prior Publication Data

US 2002/0046161 A1  Apr. 18, 2002

(30) Foreign Application Priority Data

Oct. 13, 2000 (JP) .................. P. 2000-313247

(51) Int. Cl.
G06Q 40/00 (2006.01)
(52) U.S. Cl. ...................................... 705/35
(58) Field of Classification Search .................. 705/41, 705/42, 43, 25
See application file for complete search history.

(56) References Cited

U.S. PATENT DOCUMENTS

| 3,544,769 | A |   | 12/1970 | Hedin |  |
|---|---|---|---|---|---|
| 4,900,903 | A | * | 2/1990 | Wright et al. | 235/380 |
| 4,973,828 | A |   | 11/1990 | Naruse et al. |  |
| 5,819,226 | A | * | 10/1998 | Gopinathan et al. | 705/44 |
| 7,012,547 | B2 | * | 3/2006 | Hassett | 340/928 |
| 2001/0034702 | A1 | * | 10/2001 | Mockett et al. | 705/39 |
| 2002/0103752 | A1 | * | 8/2002 | Berger et al. | 705/39 |

FOREIGN PATENT DOCUMENTS

| AU | 96/54032 | 10/1996 |
| DE | 689 18 744 | 4/1989 |
| DE | 696 01 787 | 4/1996 |
| EP | 0 820 620 | 1/1998 |
| JP | 2-62693 | 3/1990 |
| JP | 6-259644 | 9/1994 |
| JP | 08-161585 A | 6/1996 |
| JP | 08-292036 A | 11/1996 |
| JP | 10-226315 A | 8/1998 |
| JP | 10-260053 A | 9/1998 |
| JP | 11-213080 | 8/1999 |
| JP | 2000-090157 A | 3/2000 |
| JP | 2000-099782 A | 4/2000 |
| JP | 2000-222688 A | 8/2000 |

(Continued)

OTHER PUBLICATIONS

Microsoft Money for Windows, version 3.5 (translated version of document identified in Applicants's Information Disclosure Statement).*

(Continued)

Primary Examiner—Jason M Borlinghaus
(74) Attorney, Agent, or Firm—Sughrue Mion, PLLC

(57) ABSTRACT

An information terminal apparatus includes: a communication unit for transmitting/receiving information among the communication means, a server of a credit card firm, and a server owned by a settling financial institution which settles a charge requested from the credit card firm; a processor for executing a comparison process as to both credit card charge historical information issued from the credit card firm and balance account information saved in the settling financial institution, the credit card charge historical information being contained in the transmission/reception information of the communication unit; and an output unit for outputting predetermined information based upon the comparison process result by the processing means.

15 Claims, 21 Drawing Sheets

FOREIGN PATENT DOCUMENTS

WO  WO 96/32701  10/1996

OTHER PUBLICATIONS

Notification of Reasons for Refusal dated Jan. 6, 2009.

Tomohiro Egawa; "Chasing Progress of Database Marketing in Point Card System, Cardwave"; Japan C-Media Co., Ltd.; Jun. 10, 2000; vol. 13 No. 7; pp. 18-23.

Hitofumi Sugiyama; "Leading-Edge Trend, Financial Information System of Telephone Banking in our Country"; The Center for Financial Industry Information Systems; Nov. 1, 1998; No. 207; p. 44.

Japanese Office Action dated Sep. 30, 2008.

* cited by examiner

FIG. 4A 2000. 06. 30  BILL AT VEHICLE

| | | |
|---|---|---|
| 06. 05 | TOLL (ASHIYA) | ¥1,200 |
| 06. 10 | GASOLINE (CARD A) | ¥2,980 |
| 06. 22 | GASOLINE (CARD A) | ¥3,680 |
| TOTAL | | ¥7,860 |

FIG. 4B 2000. 06. 30  TOTAL BILL

| | |
|---|---|
| ETC | ¥1,200 |
| DATA SERVICE | ¥800 |
| CARD A | ¥112,000 |
| CARD B | ¥304,464 |
| SUB TOTAL | ¥418,464 |
| PHONE | ¥10,700 |
| ELECTRIC | ¥23,456 |
| WATER | ¥4,230 |
| SUB TOTAL | ¥38,386 |

FIG. 4C 2000. 07. 05

| | |
|---|---|
| YOUR TOTAL BILL | ¥456,850 |
| YOUR DEPOSIT (BANK A) | ¥423,230 |

CAUTION!!

<< YOUR DEPOSIT IS NOT ENOUGH IN THE BANK! >>

FIG. 4D 2000. 06. 30  08:43

ID CODE : PASSED
PHONE NUMBER : PASSED
PASSWORD : PASSED
PIN CODE : PASSED

GOOD MORNING, GEORGE!!
HOW ARE YOU?

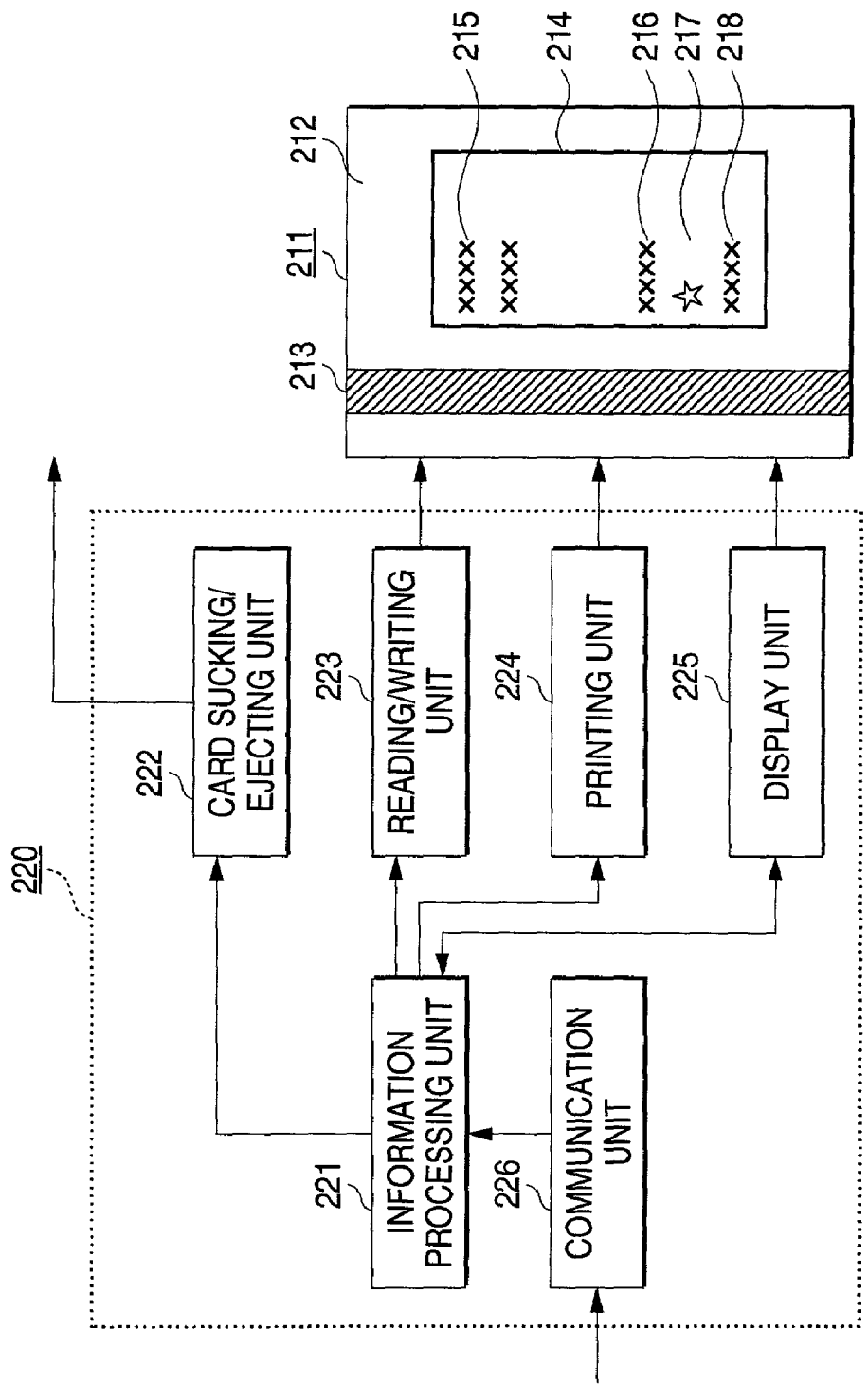

INFORMATION TERMINAL APPARATUS

BACKGROUND OF THE INVENTION

1. Field of the Invention

The present invention is related to an information terminal apparatus belonging to a field of an information appliance, and more specifically, is directed to such an information terminal apparatus capable of processing electronic settlement information using a credit card and the like.

2. Description of the Related Art

Very recently, electronic settlements using prepaid cards and credit cards have been popularized. While utilizing this electronic settlement, novel information systems and novel information appliances have been rapidly developed in order to highly improve utility and comfortability.

As one example of these information systems, FIG. 21 schematically indicates the structural diagram of the conventional charge history display system disclosed in Japanese Laid-open Patent Application No. Hei-2-62693 entitled "USE HISTORY DISPLAY PREPAID CARD SYSTEM." In this drawing, reference numeral 211 shows a prepaid card, reference numeral 212 represents a rear surface of the prepaid card, reference numeral 213 indicates a magnetic stripe on which personal information of a user and information about a card use history and so on are recorded, and reference numeral 214 shows a printing area on which characters and stamps of use history and the like are printed. Also, reference numerals 215 and 216 indicate a printed used money amount in the past, reference numeral 217 represents a star stamp which is printed so as to call an attention to a user, and reference numeral 218 indicates a final used money amount which is printed out.

Also, reference numeral 220 shows a reader/writer capable of reading/writing the information of the magnetic stripe 213 of the prepaid card 211, and of printing on the printing area 214, reference numeral 221 shows an information processing unit, reference numeral 222 represents a card sucking/ejecting unit, reference numeral 223 represents a reading/writing unit, reference numeral 224 denotes a printing unit, reference numeral 225 shows a display unit, and reference numeral 226 indicates a communication unit which is communicated with an external appliance.

Next, the operation of this conventional charge history display system will now be explained.

The surface of the prepaid card 211 is provided with the magnetic stripe 213 used to record thereon the left money (balance) amount, and the printing area 214 on which either the used money amount or the use time is printed. The rear surface 212 of the prepaid card 211 constitutes the area where either the trademark or the design is printed.

With respect to the surface of the prepaid card 211, either the usable money amount or the use time, which are determined in correspondence with the prepaid money amount, is firstly recorded on the magnetic stripe 213. Every time this prepaid card 211 is used, either the used money amount or the money amount equal to the use time is subtracted from the usable money amount, and the left money amount is recorded on the magnetic stripe 213, and furthermore, either the used money amount or the use time is printed on the printing area 214.

The reader/writer 220 is arranged by the information processing unit 221, the card sucking/ejecting unit 222, the reading/writing unit 223, the printing unit 224, the display unit 225 made of a liquid crystal display, and the communication unit 226. The card sucking/ejecting unit 222 controls the sucking/ejecting/positioning of the prepaid card. The reading/writing unit 223 reads/writes the information recorded on the magnetic stripe 213. The printing unit 224 prints on the printing area 214. The communication unit 226 communicates the information containing the used money amount with respect to the settlement system.

For example, in the case that the user purchases the product, or the article having the money amount "A" by using the prepaid card 211, the price amount "A" is printed on the used money amount 215 after the first card use in the printing area 214. Subsequently, every time the user uses this prepaid card 211, the printing operation is carried out toward the lower portion of the printing area 214. This operation is continued until the left money amount, balance amount becomes equal to, or larger than a predetermined money amount "B", and then, it is so assumed that the left money amount is reached to the used money amount 216.

Then, at the time when the left money amount becomes smaller than the money amount "B" by the subsequent card use, the star mark 217 corresponding to a predetermined shape mark is printed out, or stamped in order to call the attention of the user to such a fact that the left money amount becomes small. The used money amount 218 at this time is also printed.

The money amount "B" may constitute such a reference which may notify a small amount of left memory to the user, and corresponds a predetermined fixed money amount. This money amount "B" is set to such a money amount defined by multiplying the averaged use money amount per one time by several number.

As previously explained, in accordance with the conventional use history display function of the prepaid card 211, the use history is indicated on the prepaid card 211 to which the usable money amount has been previously set, and either the used money amount or the use time is directly printed on this prepaid card 211. As a result, the user can directly confirm the card use condition by way of the visual manner. Also, in the case that there is only a small amount of left money, since the star mark 217 corresponding to a preselected shaped mark is printed out, this star mark 217 can pay the visual attention to the user.

However, the above-explained conventional electronic settlement system with employment of the credit card owns such a problem, namely the charge amount paid by using the credit card cannot be settled by the balance deposited on the bank account of the settlement of the settling financial institution such as the bank and the post office. In other words, in such an electronic settlement using the credit card, the total money amount used by the user is paid from the bank account of the settling financial institution. Then, the user cannot become aware of such a fact that the total charge amount paid by using the credit card exceeds the presently left money amount (present balance amount) of the bank account, resulting in no settlement.

SUMMARY OF THE INVENTION

The present invention has been made to solve the above-explained problem, and therefore, has an object to obtain such an information terminal apparatus capable of avoid in advance "no settlement" in such a manner that while charge historical information with respect to a bank account in an electronic settlement using a credit card and the like is confirmed, a warning notice is given to a user when a total charge amount may most probably exceed a money amount left in the bank account.

The present invention owns a further object to obtain a highly-reliable information terminal apparatus having high utility by employing the following functions, namely a function used to totalize charge historical information, another function used to extract user taste information from the charge historical information so as to quickly provide information suitable for the user, and also another security function capable of preventing unfair use by a third party. This charge historical information may involve toll road fee historical information acquired by an ETC (Electronic Toll Collection System) in such a case that this information terminal apparatus is mounted on a vehicle.

An information terminal apparatus, according to the present invention, is featured by comprising: communication means for transmitting/receiving information among the own communication means, a server of a credit card firm, and a server owned by a settling financial institution which settles a charge requested from the credit card firm; processing means for executing a comparison process as to both credit card charge historical information issued from the credit card firm and balance account information saved in the settling financial institution, the credit card charge historical information being contained in the transmission/reception information of the communication means; and output means for outputting predetermined information based upon the comparison process result by the processing means.

Also, in the information terminal apparatus according to the present invention, the processing means is comprised of: periodic charge information extracting means for extracting periodic charge information from the credit card charge historical information; and prediction means for predicting an estimated charge amount based on the extracted periodic charge information; and the processing means executes the comparison process as to the credit card charge historical information containing the estimated charge amount and the balance account information.

Also, in the information terminal apparatus according to the present invention, the processing means is comprised of: taste information extracting means for extracting taste information of a user based upon shop use historical information, facilities use historical information, or shopping historical information, which are contained in the credit card charge historical information; and providing means for providing the taste information with a top priority while the shop or the facilities are retrieved.

Also, in the information terminal apparatus according to the present invention, the information terminal apparatus is further comprised of: storage means for storing thereinto the taste information extracted by the taste information extracting means.

Also, in the information terminal apparatus according to the present invention, the storage means is constituted by a non-volatile storage medium; and the storage means is arranged in such a manner that the taste information can be replaced with respect to an external appliance, while the storage means is detachably mounted on the information terminal apparatus, or is communicated to the external appliance.

Also, in the information terminal apparatus according to the present invention, the information terminal apparatus is further comprised of: input means for inputting first identification information used to specify a user; and identifying means for judging as to whether or not the user can use the credit card based upon the first identification information entered by the input means.

Also, in the information terminal apparatus according to the present invention, the input means utilizes a remote control operation by way of a wireless communication.

Also, in the information terminal apparatus according to the present invention, the input means inputs second identification information which is transmitted from the communication means to both the credit card firm and the server of the settling financial institution so as to identify the user.

Also, in the information terminal apparatus according to the present invention, the communication means is comprised of: monitoring means for monitoring operation conditions of the communication means; and warning means for issuing a warning notice in the case that an abnormal operation is confirmed by the monitoring means.

Also, in the information terminal apparatus according to the present invention, the communication means is comprised of: releasing means for releasing the operation of either the monitoring means or the warning means by inputting thereinto third identification information used to identify the user.

Also, in the information terminal apparatus according to the present invention, in such a case that the monitoring means confirms the abnormal operation of the communication function under such a state that the operation of the monitoring means is not released by the releasing means, the warning notice is issued by the warning means.

Also, in the information terminal apparatus according to the present invention, the communication means is further comprised of: positional move sensing means for sensing a positional move of the communication means; and in such a case that the monitoring means confirms the abnormal operation of the communication function under such a state that the operation of the monitoring means is not released by the releasing means, the warning notice is issued by the warning means.

Also, in the information terminal apparatus according to the present invention, in such a case that unfair information is entered into the releasing means under such a state that the operation of the monitoring means is not released by the releasing means, the warning notice is issued by the warning means.

Also, in the information terminal apparatus according to the present invention, the information terminal apparatus is mounted on a mobile object; and the processing means executes a comparison process as to toll road fee historical information supplied from an electric toll collection system, the credit card charge historical information, and the balance account information.

Also, in the information terminal apparatus according to the present invention, the information terminal apparatus is mounted on a mobile object; and the processing means is comprised of: taste information extracting means for extracting taste information of the user based upon either shopping historical information or shop and/or facilities use historical information, which are contained in the credit card charge historical information, and also travel path historical information supplied from the credit card charge historical information; and providing means for providing the taste information with a top priority while the shop, the facilities, or the route is sought.

BRIEF DESCRIPTION OF THE DRAWINGS

FIGS. 4A to 4D are diagrams showing output display example of the on-vehicle information terminal apparatus according to the embodiments 1 and 5 of the present invention;

FIG. 21 is the structural diagram for indicating the conventional charge history display system.

DETAILED DESCRIPTION OF THE PREFERRED EMBODIMENTS

Now, a description will be given in more details of an on-vehicle information terminal apparatus which is mounted on a vehicle corresponding to a mobile object according to embodiments of the invention with reference to the accompanying drawings.

Embodiment 1

Figure 1:
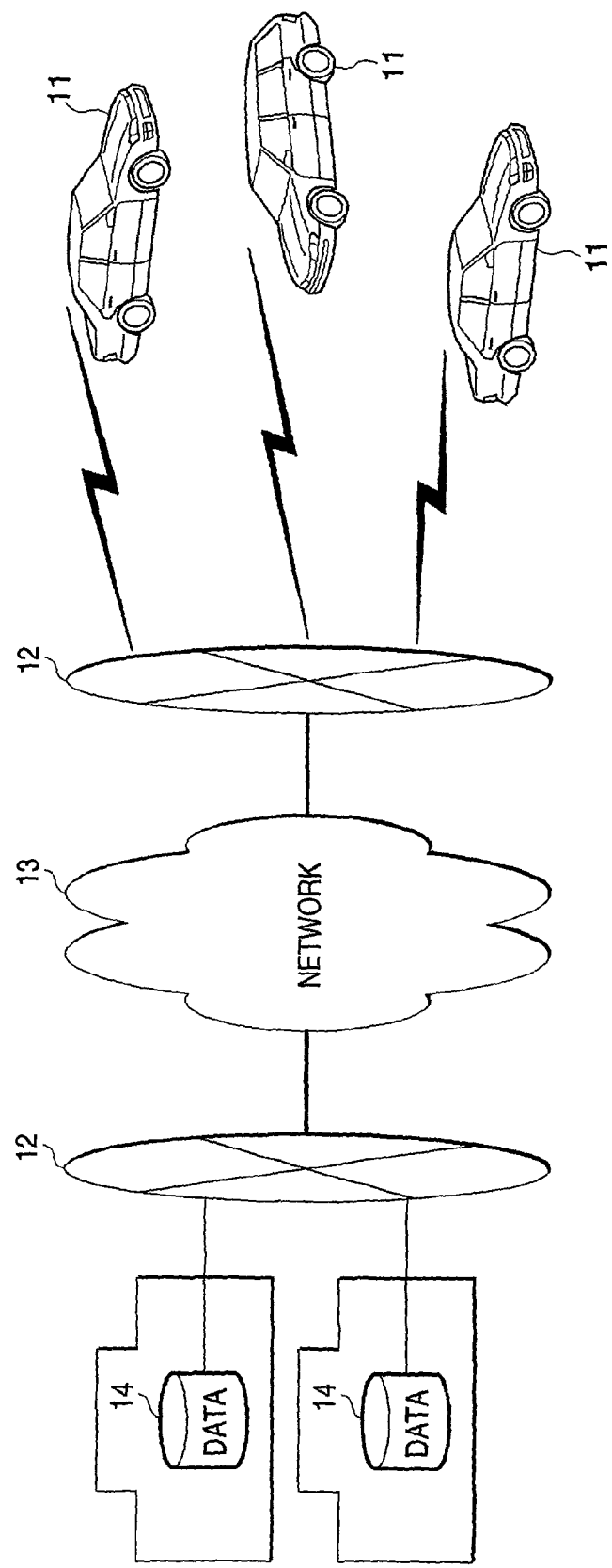
FIG. 1 is a conceptional system diagram using an on-vehicle information terminal apparatus according to an embodiment 1 of the present invention.

FIG. 1 shows a conceptional system diagram in which an on-vehicle information terminal apparatus according to an embodiment 1 of the present invention is utilized. Reference numeral 11 shows a vehicle functioning as the mobile object, on which the on-vehicle information terminal apparatus is mounted. Reference numeral 12 indicates a communication line such as a telephone, reference numeral 13 shows a network such as the Internet, and reference numeral 14 represents a server of a credit card firm, and also a server of a settling financial institution and the like, which may settle a charge requested from the credit card firm.

Figure 2:
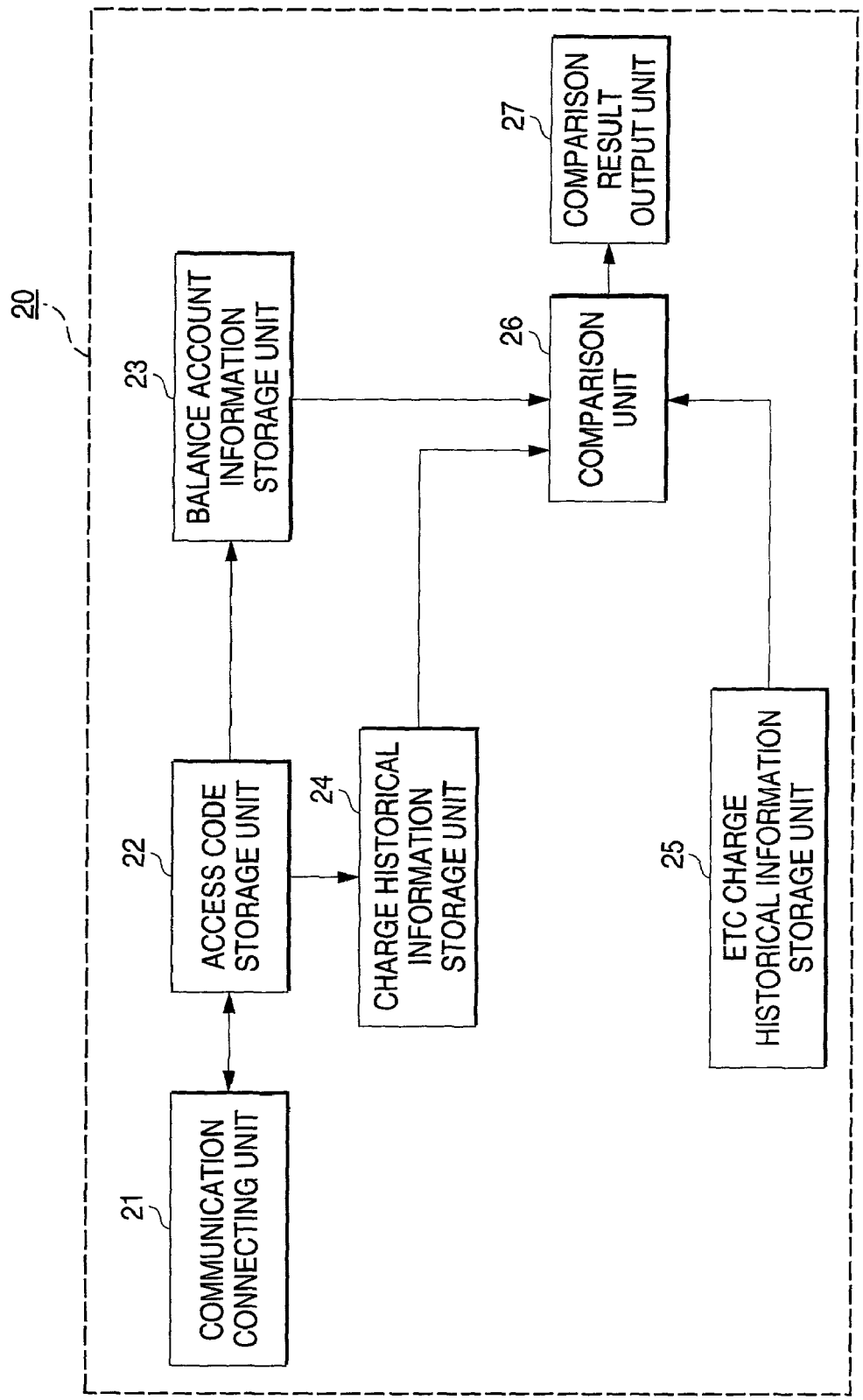
FIG. 2 is a functional structural block diagram of the on-vehicle information terminal apparatus according to the embodiment 1 of the present invention.

FIG. 2 is a functional block diagram for schematically indicating a functional arrangement of the on-vehicle information terminal apparatus according to the embodiment 1. Reference numeral 20 shows an on-vehicle information terminal apparatus, and reference numeral 21 represents a communication connecting unit functioning as a communication means. This communication connecting unit 21 is constructed of an automobile telephone, a portable telephone and the like, which are connected to the communication line 12. Also, reference numeral 22 indicates an access code storage unit. This access code storage unit 22 stores thereinto an access code such as a secret number and personal discrimination information such as an ID (identification) number, which are used to access the server 14 of the credit card firm and the server 14 of the settling financial institution. Also, reference numeral 23 shows a balance account information storage unit for storing thereinto balance account information saved in the settling financial institution, reference numeral 24 represents a charge historical information storage unit for storing thereinto credit card charge historical information saved in the credit card firm, and reference numeral 25 indicates an ETC charge historical information storage unit for storing thereinto ETC charge historical information. Also, reference numeral 26 shows a comparing unit functioning as a processing means, constructed of a CPU and the like. This comparing unit 26 compares various sorts of charge historical information with the balance account information. Reference numeral 27 denotes a comparison result output unit functioning as an output means. This comparison result output unit 27 is arranged by an output apparatus such as a display unit and a printer, which output the comparison result.

Figure 3:
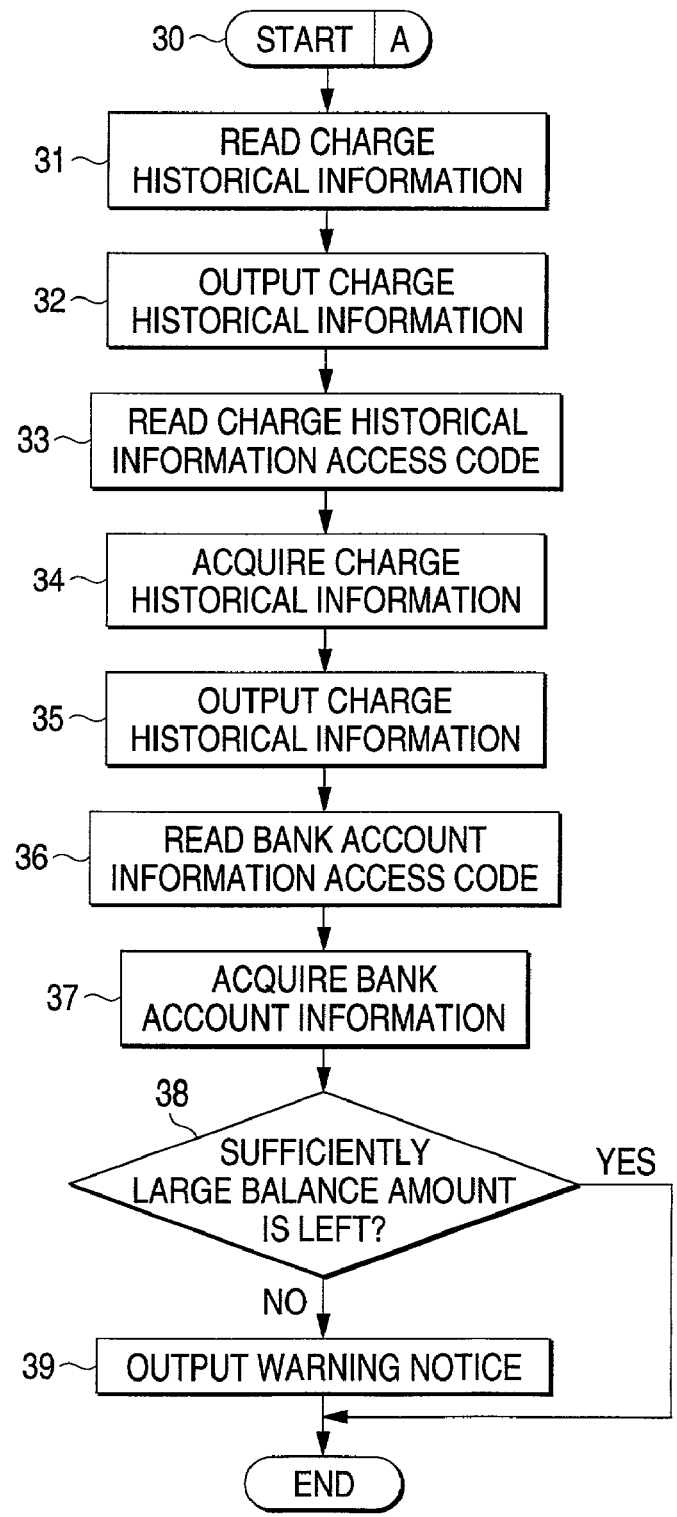
FIG. 3 is an operation flow chart for explaining operations of the on-vehicle information terminal apparatus according to the embodiment 1 of the present invention.

FIG. 3 is an operation flow chart for explaining operations of the on-vehicle information terminal apparatus 20 according to the embodiment 1. In this flow chart, a step 31 shows an ETC charge history reading process; a step 32 represents an ETC charge historical information output process; a step 33 indicates an access code reading process with respect to credit card charge historical information; and a step 34 denotes an acquiring step of the credit card charge historical information. Also, a step 35 is a credit card charge historical information outputting process; a step 36 shows bank account information access code reading process of a settling financial institution, a step 37 represents a bank account information acquiring process; a step 38 indicates a balance amount comparing process, and also a step 39 denotes a warning output process for a shortage of balance amount.

FIGS. 4A to 4D pictorially show an output display example of the on-vehicle information terminal apparatus 20 according to the embodiment 1. FIG. 4A indicates an output example of charge historical information as to a charge of an ETC system and a gas rate paid by a credit card. FIG. 4B shows an output example of charge historical information including charges by using a plurality of credit cards, electricity bills, telephone charges, and gas rates. FIG. 4C represents an output example of a balance amount comparison result. Also, FIG. 4D shows an output example of a confirmation result of identification information of a user (will be discussed in embodiment 5).

Next, operations of the on-vehicle information terminal apparatus 20 will now be described.

In FIG. 3, in the on-vehicle information terminal apparatus 20 mounted on the vehicle 11, charge history of the ETC system is first read out from the ETC charge historical information storage unit 25 (step 31). At this time, for example, as shown in FIG. 4A, this charge historical information may be outputted to the comparison result output unit 27 (step 32).

It should be noted that if the ETC system is not mounted on the vehicle 11, then this process operation may be omitted.

Next, the credit card charge historical information access code is read out from the access code storage unit 22 (step 33). The on-vehicle information terminal apparatus 20 is connected from the communication connecting unit 21 to the communication line 12 so as to access via the network 13 to the server 14 of the credit card firm. Then, this on-vehicle information terminal apparatus 20 acquires either a total charge amount of a credit card and the like or the individual use historical information and then stores the acquired information into the charge historical information storage unit 24 (step 34). At this time, the on-vehicle information terminal apparatus 20 may output the acquired information on the comparison result output unit 27 as shown in FIG. 4B, for example (step 35).

Furthermore, the on-vehicle information terminal apparatus 20 reads out the bank account information access code of the settling financial institution from the access code storage unit 22 (step 36), and then is connected from the communication connecting unit 21 to the communication line 12 so as to access the server 14 of the settling financial institution via the network 13. Then, the on-vehicle information terminal apparatus 20 acquires either the balance amount or the bank account information such as deposit/withdraw money history, and then stores the acquired information into the balance amount information storage unit 23 (step 37).

In this embodiment 1, the on-vehicle information terminal apparatus 20 directly accesses the server 14 of either the credit card firm or the settling financial institution. Alternatively, the on-vehicle information terminal apparatus 20 may access a mail server of the Internet of a user so as to acquire an electronic mail sent from the credit card firm, or the settling financial institution. Also, the on-vehicle information terminal apparatus 20 may extract either charge historical information or balance amount information, which are described in a received electronic mail, so as to acquire such necessary information.

After the on-vehicle information terminal apparatus 20 has acquired the charge historical information and/or the balance amount information, all of the acquired charge historical information is compared with the balance amount information by the comparing unit 26 (step 38). When the balance amount is short of money, the comparison result is outputted to the comparison result output unit 27, for example, as shown in FIG. 4C. Then, the on-vehicle information terminal apparatus 20 issues a warning notice about a shortage of money (step 39).

As previously explained in detail, since the on-vehicle information terminal apparatus 20, according to the embodiment 1, is arranged by comprising: the communication connecting unit 21 for transmitting/receiving the information among the own communication connecting unit 21, the server 14 of the credit card firm, the server 14 of the settling financial institution which settles the charge requested from the credit card firm; the comparing unit 26 for executing the comparison process as to both the credit card charge historical information issued from the credit card firm and the balance account information saved in the settling financial institution, this credit card charge historical information being contained in the transmission/reception information of the communication connecting unit 21; and the comparison result output unit 27 for outputting a shortage of balance amount based upon the comparison process result by the comparing unit 26, such information as to a shortage of the balance amount of the bank account can be informed in advance to the user. As a result, the highly-reliable information terminal apparatus with comfortability can be obtained by avoiding in advance the occurrence of non-settlement problem due to a shortage of the balance amount of the bank account.

Also, in accordance with the embodiment 1, in the case that the ETC system is mounted on the vehicle 11, since the comparing unit 26 executes the comparison process operation as to the ETC charge historical information supplied from the ETC system, the credit card charge historical information, and the balance amount information, such information as to a shortage of the balance amount of the bank account can be informed in advance to the user, while considering the ETC charge historical information. As a result, the highly-reliable information terminal apparatus with comfortability can be obtained by avoiding in advance the occurrence of non-settlement problem due to a shortage of the balance amount of the bank account.

Embodiment 2

Figure 5:
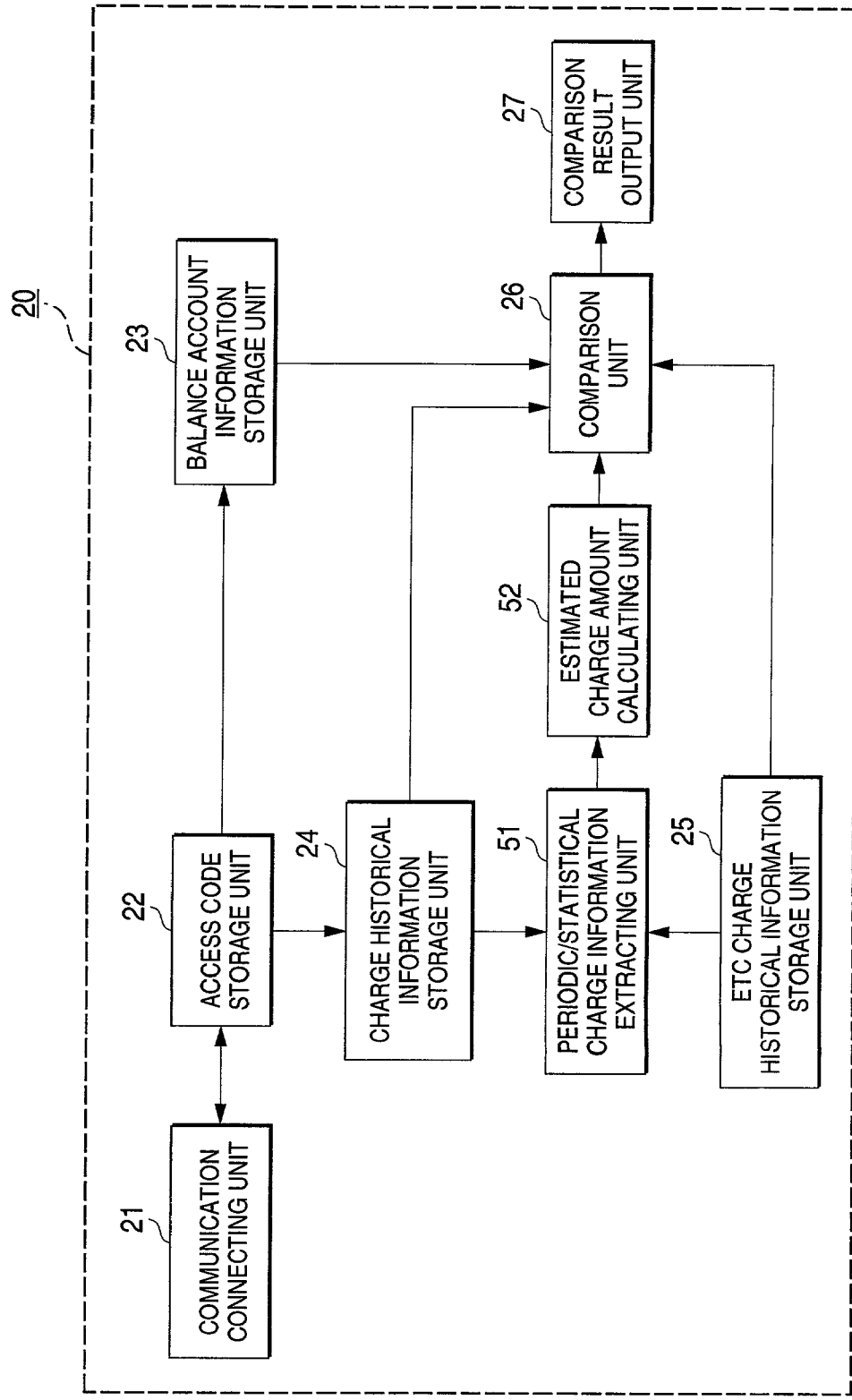
FIG. 5 is a functional structural block diagram of an on-vehicle information terminal apparatus according to an embodiment 2 of the present invention.

FIG. 5 is a functional block diagram for representing an arrangement of an on-vehicle information terminal apparatus 20 according to an embodiment 2 of the present invention. In this drawing, reference numeral 51 shows a periodic/statistical charge information extracting unit functioning as a periodic charge information extracting means, and reference numeral 52 represents an estimated charge amount calculating unit functioning as a predicting means for calculating a periodic/statistical estimated charge amount in future. Other structural units of this on-vehicle information terminal apparatus 20 are similar to those of the embodiment 1 shown in FIG. 2.

Figure 6:
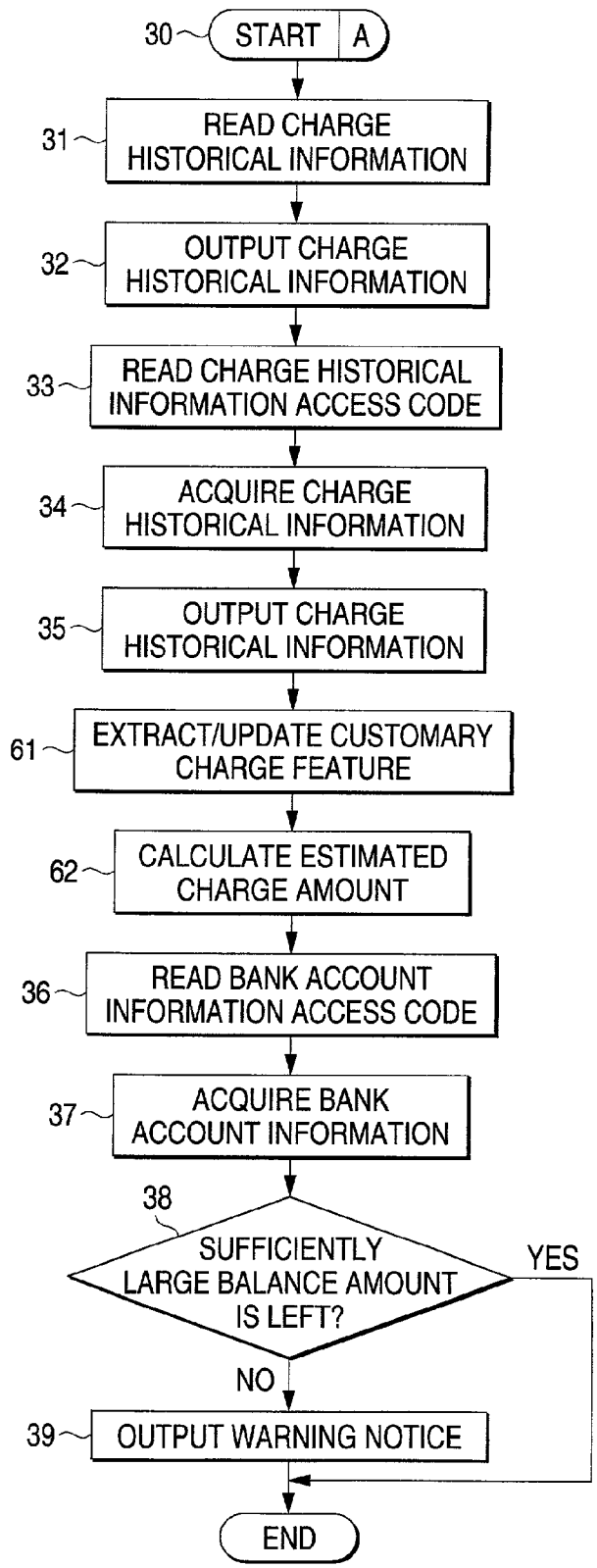
FIG. 6 is an operation flow chart for explaining operations of the on-vehicle information terminal apparatus according to the embodiment 2 of the present invention.

FIG. 6 is an operation flow chart for explaining operations of the on-vehicle information terminal apparatus 20 according to the embodiment 2. A step 61 represents an extracting/updating process of a customary charge feature, and a step 62 indicates a calculating process of an estimated charge amount in future. Other steps of this flow chart are similar to those of the embodiment 1 shown in FIG. 3.

Next, a description will now be made of operations of the on-vehicle information terminal apparatus according to the embodiment 2.

Similar to the flow chart of the embodiment 1 shown in FIG. 3, in the flow operation of FIG. 6, the periodic/statistical charge information extracting unit 51 extracts as the customary feature, either periodically charged information (for instance, electricity bill, and gas/water rates per month) or statistically charged result information based upon the various sorts of charge historical information stored in both the ETC charge historical information storage unit 25 and the charge historical information storage unit 24, and then updates these extracted customary feature information as the latest information (step 61). Next, the estimated charge amount calculating unit 52 calculates an estimated charge amount in future based on the above-explained updated latest information (step 62).

Then, the comparing unit 26 compares the balance amount of the bank account with not only the charge historical information which has been utilized as the actual result, but also the estimated future amount calculated by the estimated charge amount calculating unit 32 (step 38). In this comparison, when the balance amount is a short of money, the comparison result output unit 27 issues in advance a warning notice as to a shortage of the balance amount (step 39).

In accordance with the on-vehicle information terminal apparatus 20 of this embodiment 2, while the processing means is comprised of the periodic/statistical charge information extracting unit 51 for extracting periodic/statistical charge information from the credit card charge historical information; and the estimated amount charge calculating unit 52 for predicting the estimated charge amount in future based on the extracted periodic/statistical charge information, the comparing unit 26 executes the comparison process as the credit card charge historical information containing the estimated charge amount and the balance account information. Since such information that a shortage of the balance amount of the bank account may occur is informed in advance to the user, the highly-reliable information terminal apparatus with comfortability can be obtained by avoiding in advance the occurrence of non-settlement problem due to such a shortage of the balance amount of the bank account.

Embodiment 3

Figure 7:
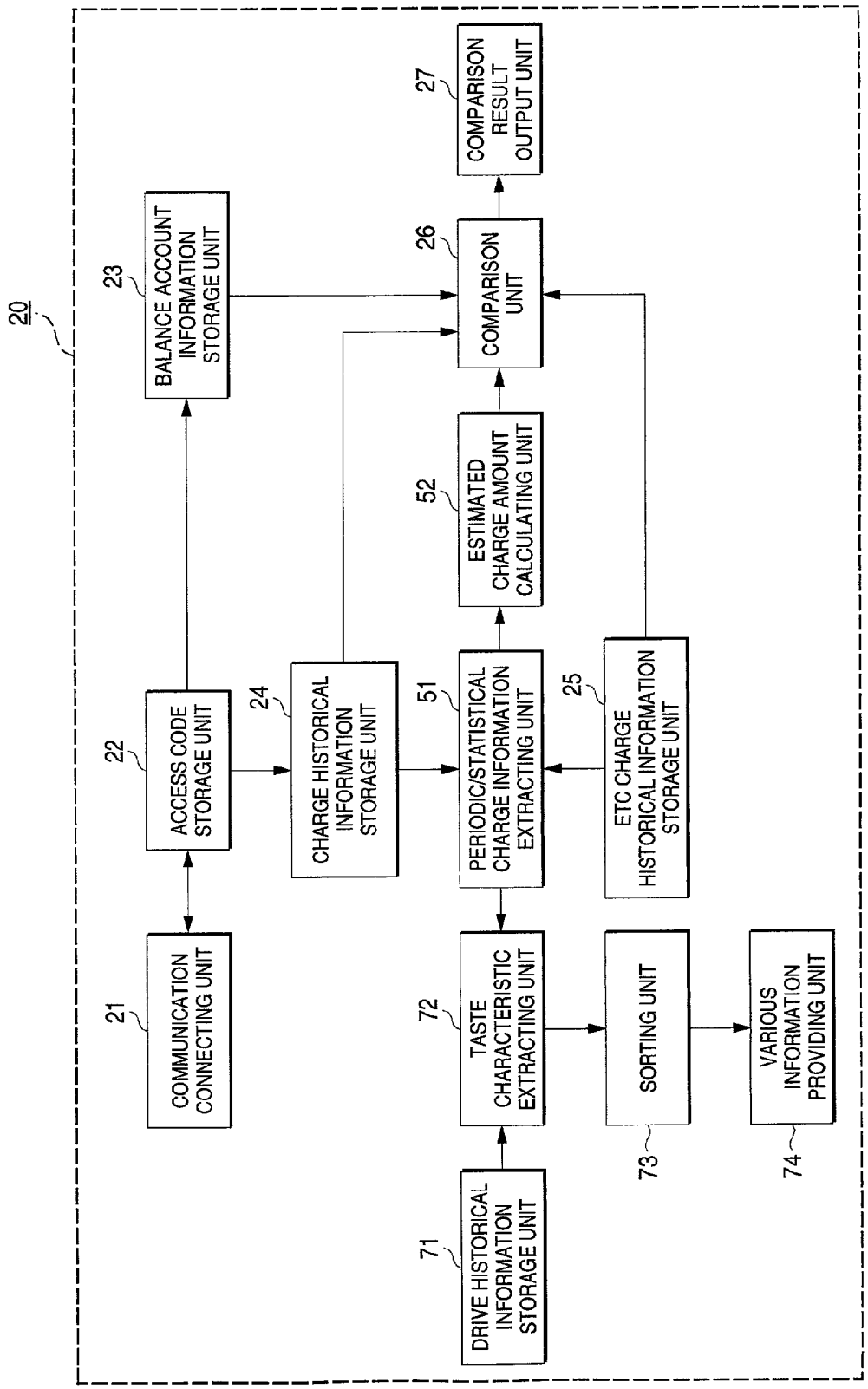
FIG. 7 is a functional structural block diagram of an on-vehicle information terminal apparatus according to an embodiment 3 of the present invention.

FIG. 7 is a functional block diagram for representing an arrangement of an on-vehicle information terminal apparatus 20 according to an embodiment 3 of the present invention. In this drawing, reference numeral 71 shows a drive historical information storage unit for storing thereinto as move path historical information, a vehicle travel route in the past, which is acquired from a navigation system. Reference numeral 72 indicates a taste characteristic extracting unit functioning as a taste information extracting means. The taste information extracting means extracts an action pattern and/or taste information such as facilities and shops where a user usually visits. Reference numeral 73 shows a sorting unit for sorting display orders of various information providing menus on a selection list. Also, reference numeral 74 denotes a various information providing unit functioning as a providing means for providing various sorts of information. Other structural units of this embodiment 3 are similar to those of the embodiment 2 shown in FIG. 5.

Figure 8:
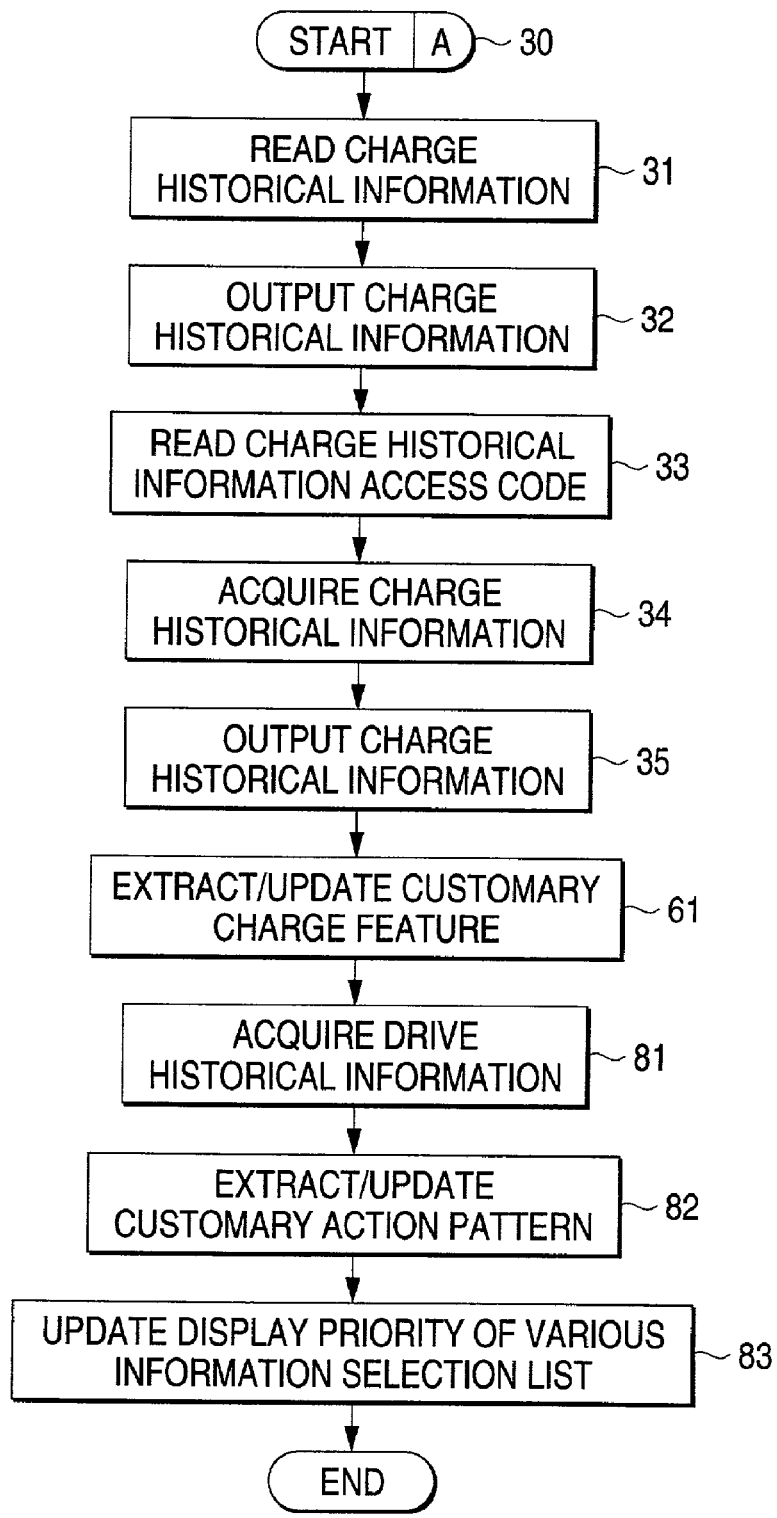
FIG. 8 is an operation flow chart for explaining operations of the on-vehicle information terminal apparatus according to the embodiment 3 of the present invention.

FIG. 8 is an operation flow chart for explaining operations of the on-vehicle information terminal apparatus 20 according to the embodiment 3. A step 81 shows a drive history information process, a step 82 indicates a customary action pattern extracting/updating process, and a step 83 represents a process of updating a display priority of various information providing menus. Other process steps are similar to those of the embodiment 2 shown in FIG. 6.

Next, a description will now be made of operations of the on-vehicle information terminal apparatus according to the embodiment 3.

Similar to the flow chart of the embodiment 2 shown in FIG. 6, in the flow operation of FIG. 8, the taste characteristic extracting unit 72 extracts either an action pattern or a customary action pattern such as the facility and the shop where the user usually visits based upon the customary feature in the consumption by the user extracted by the periodic/statistical charge information extracting unit 51, and also the customary feature in the vehicle drive by the user, which is extracted by the drive historical information storage unit 71 (step 81). Then, the taste characteristic extracting unit 72 updates the extracted action patterns as the latest information (step 82). Next, based upon the above-explained information, the sorting unit 73 updates the display priority order of the various information providing menus to the selection list (step 83).

The various information providing unit 74 may quickly provide priority information by such a function which is sufficiently used by the user based upon this updated priority order, for example, setting of a drive route by a path search, and also a target retrieve such as a shop and the facility in a navigation system.

In accordance with the information terminal apparatus of the embodiment 3, since the processing means is comprised of the taste characteristic extracting unit 72 for extracting the taste information of the user based upon the shop use historical information, the facilities use historical information, or the shopping historical information, which are contained in the credit card charge historical information; and the various information providing unit 74 for providing the taste information with a top priority while the shop or the facilities are retrieved, or the route is searched, such information suitable for the taste of the user can be quickly provided.

Also, in accordance with the information terminal apparatus of the embodiment 3, since this information terminal apparatus is mounted on the vehicle 11; and the processing means is comprised of the taste characteristic extracting unit 72 for extracting the taste information of the user based upon either the shopping historical information or the shop and/or the facilities use historical information, which are contained in the credit card charge historical information, and also the drive historical information supplied from the credit card charge historical information; and the various information providing unit 74 for providing the taste information with a top priority while the shop, or the facilities are retrieved, or the route is sought. Such information suitable for the taste of the user on the vehicle 11 can be quickly provided.

Embodiment 4

Figure 9:
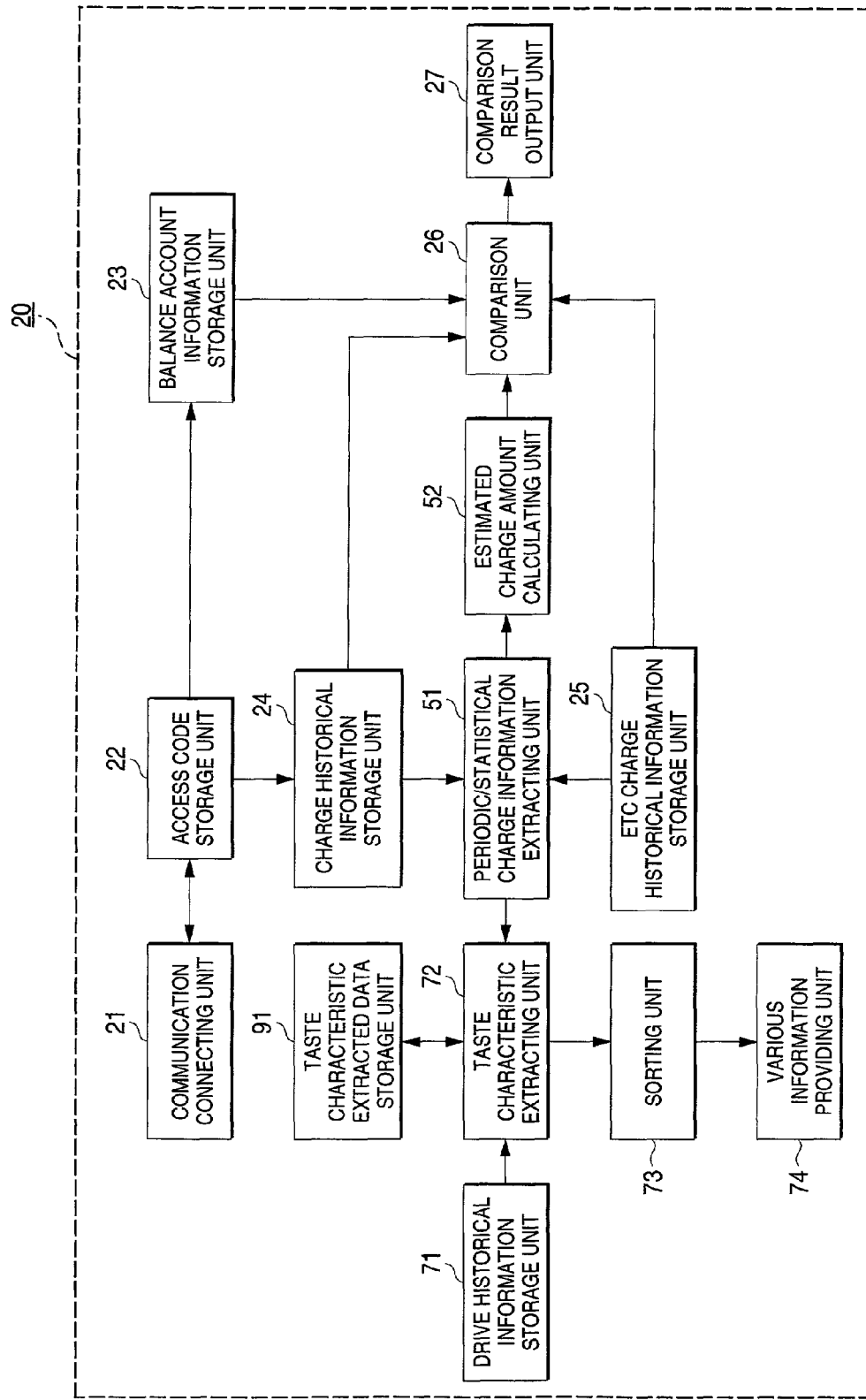
FIG. 9 is a functional structural block diagram of an on-vehicle information terminal apparatus according to an embodiment 4 of the present invention.

FIG. 9 is a functional block diagram for indicating an arrangement of an on-vehicle information terminal apparatus 20 according to an embodiment 4 of the present invention. Reference numeral 91 shows a taste characteristic extracted data storage unit functioning as a storage means. This storage means stores thereinto an action pattern extracted by a taste characteristic extracting unit 72, or taste information such as facilities and shops where a user is usually visited. Other structural units of this on-vehicle information terminal apparatus 20 are similar to those of the embodiment 3 shown in FIG. 7.

Figure 10:
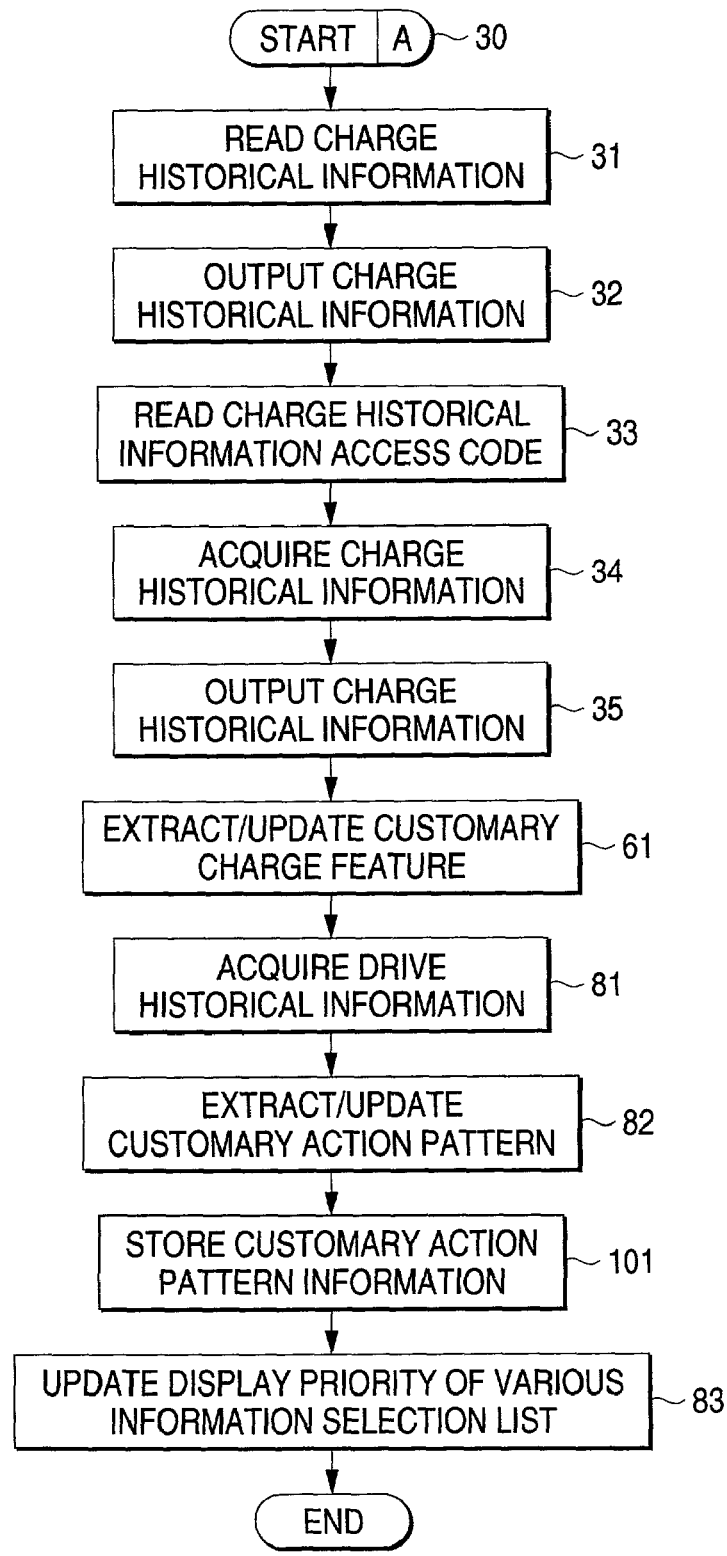
FIG. 10 is an operation flow chart for explaining operations of the on-vehicle information terminal apparatus according to the embodiment 4 of the present invention.

FIG. 10 is an operation flow chart for describing operations of the on-vehicle information terminal apparatus 20 according to the embodiment 4. In this flow chart, a step 101 indicates a process for storing customary action pattern extracted data. Other steps of this embodiment 4 are similar to those of the above-explained embodiment 3 shown in FIG. 8.

Next, a description will now be made of operations of the on-vehicle information terminal apparatus 20 according to the embodiment 4.

In FIG. 10, similar to the operation flows of the embodiment 3 shown in FIG. 8, in order to back up the customary action pattern data which is extracted/updated by the taste characteristic extracting unit 72, or back up such taste information as the facilities and the shops where the user usually visits, theses customary action pattern data, or taste information are stored in the taste characteristic extracted data storage unit 91 (step 101).

This taste characteristic extracted data storage unit 91 is constituted by a detachable non-volatile storage medium. This detachable non-volatile storage medium is known as, for instance, a RAM (random access memory) backed up by a battery, a memory IC such as a flash memory, a memory disk, a memory card and so on.

As a consequence, even in such a case that the sort of information and/or the menu system provided by the various information providing unit 74 are varied, and the display priority order of the various information providing menu to the selection list is reset, the sorting unit 73 can quickly set the priority order based upon the taste characteristic of the user in accordance with such data which is restored/read out from the taste characteristic extracted data storage unit 91.

Also, this taste characteristic extracted data storage unit 91 may be arranged in such a manner that the taste information may be transmitted/received to/from the external appliance by using a similar communication means to the communication connecting unit 21. In this alternative case, the taste information may be more simply backed up and/or restored.

In accordance with the embodiment 4, since the on-vehicle information terminal apparatus 20 is comprised of the taste characteristic extracted data storage unit 91 for storing thereinto the taste information extracted by the taste characteristic extracting unit 72, the taste information can be reused without being lost when the on-vehicle information terminal 20 is updated.

Also, in accordance with the embodiment 4, the taste characteristic extracted data storage unit 91 is constructed of the non-volatile characteristic storage medium, and may be detachably mounted such as the memory disk and the memory card. Alternatively, this taste characteristic extracted data storage unit 91 may be arranged in such a manner that the taste information may be transmitted/received to/from the external appliance by way of the communication system. As a result, when the on-vehicle information terminal apparatus 20 is updated, this taste information can be readily reused without being lost.

Embodiment 5

Figure 11:
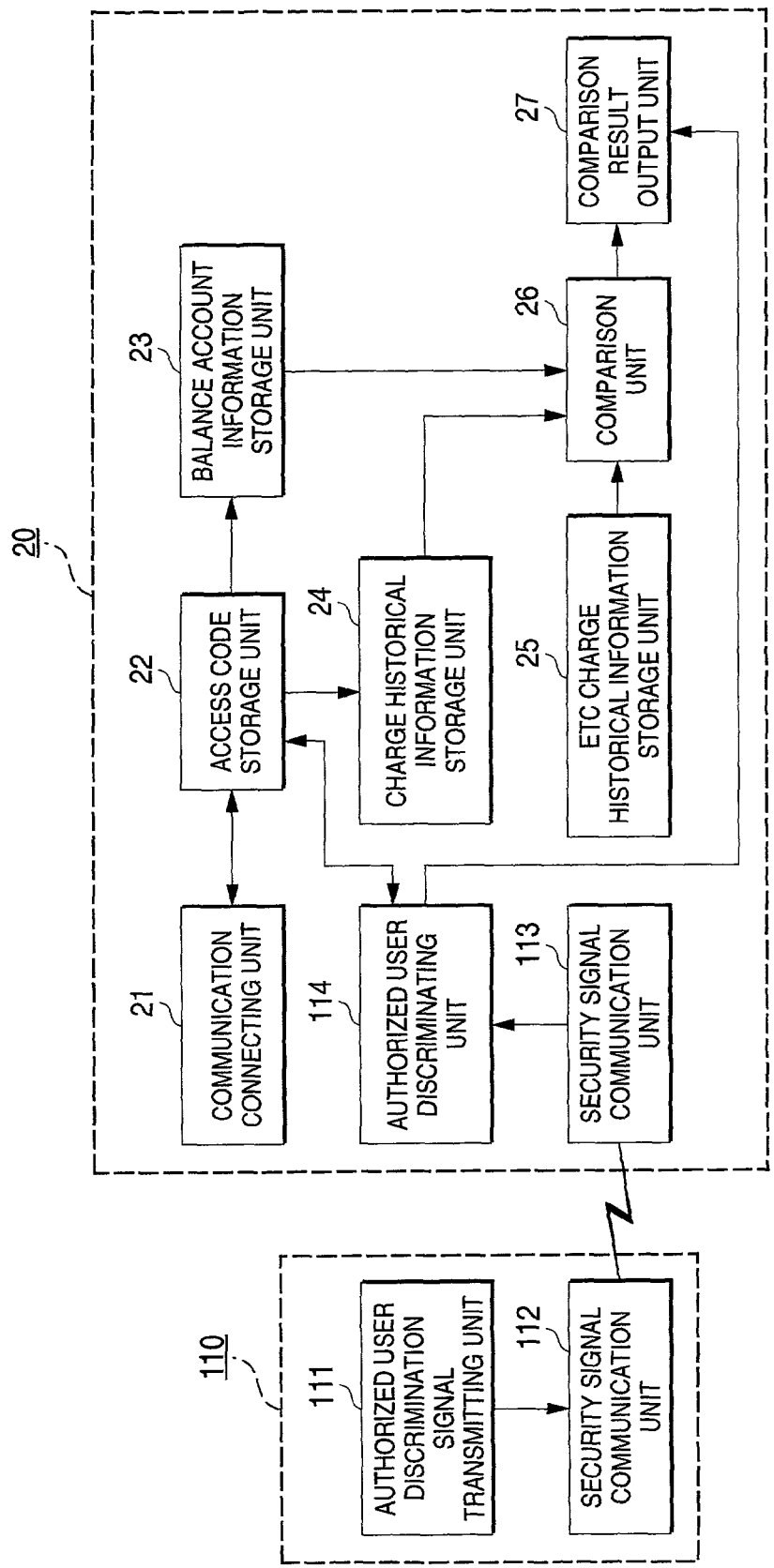
FIG. 11 is a functional structural block diagram of an on-vehicle information terminal apparatus according to an embodiment 5 of the present invention.

FIG. 11 is a functional block diagram for indicating an arrangement of an on-vehicle information terminal apparatus 20 according to an embodiment 5 of the present invention. Reference numeral 110 shows a remote control key functioning as an input means using such a wireless communication as a so-called "Bluetooth" (short distance wireless communication), and such an optical communication as infrared rays. Reference numeral 111 represents an authorized user discrimination signal transmission unit for transmitting an authorized user discrimination signal equal to first identification information used to specify a user. Reference numerals 112 and 113 show security signal communicating units for transmitting/receiving a security signal. Also, reference numeral 114 denotes an authorized user discriminating unit functioning as an identifying means for judging as to whether or not the user can use. Other structural units of the embodiment 5 are similar to those of the embodiment 1 shown in FIG. 2.

It should be noted that as the remote control key 110, it is possible to utilize such a portable telephone equipped with the wireless communication function such as the infrared optical communication and the so-called "Bluetooth" communication.

Figure 12:
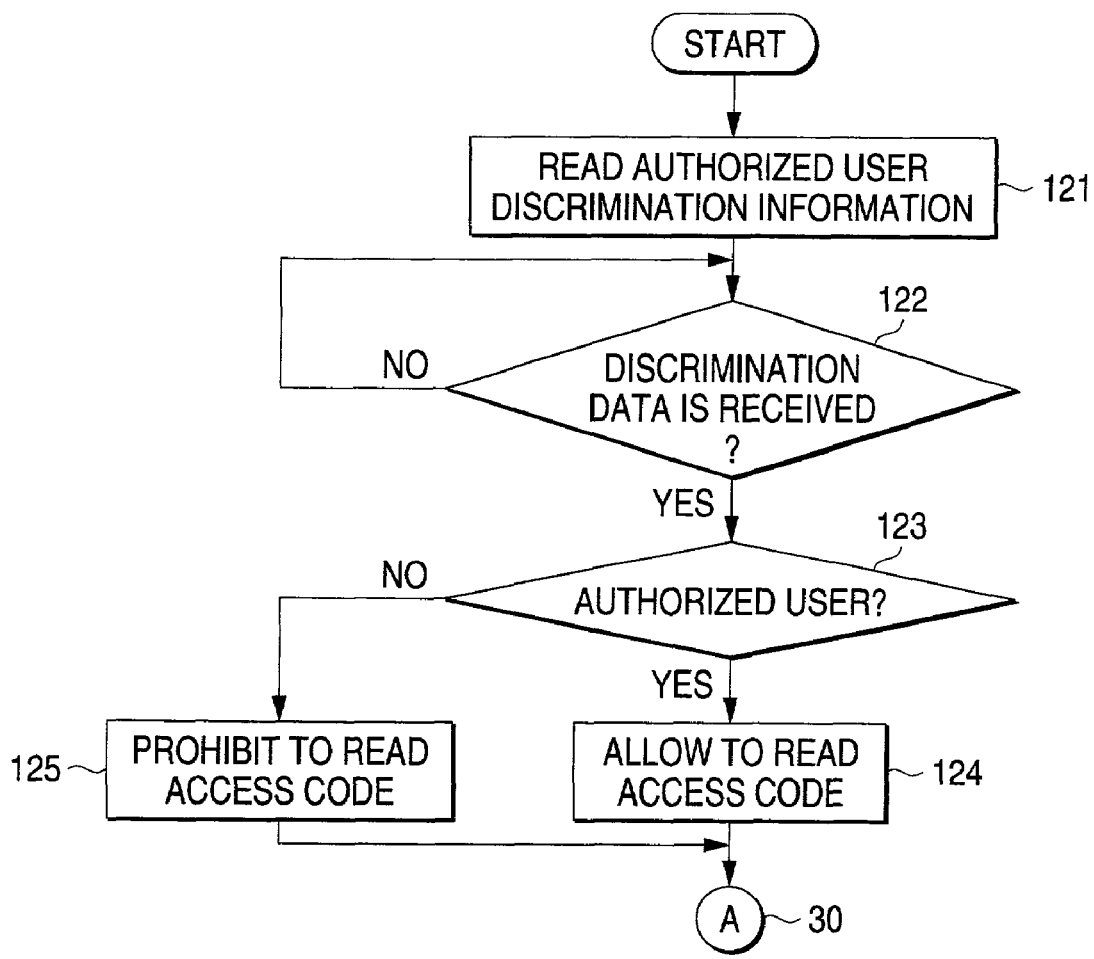
FIG. 12 is an operation flow chart for explaining operations of the on-vehicle information terminal apparatus according to the embodiment 5 of the present invention.

FIG. 12 is an operation flow chart for describing operations of the on-vehicle information terminal apparatus 20 according to the embodiment 5. In this flow chart, a step 121 indicates a process for reading authorized user discrimination information. A step 122 represents a security signal receiving step. A step 123 indicates an authorized user judging process. A step 124 represents a process for allowing reading of an access code which is used to access personal discrimination information and also the access the servers 14 of the credit card firm and the settling financial institution. Also, a step 125 indicates a process for prohibiting reading of an access code which is used to access personal discrimination information and also the access the servers 14 of the credit card firm and the settling financial institution.

The above-explained process operations are added before the respective process operations employed in the embodiment 1 to the embodiment 4 as represented in FIGS. 3, 6, 8, and 10 as such a process operation capable of judging as to whether or not reading of the personal discrimination information and the access code are allowed. This access code is used to access the servers 14 of both the credit card firm and the settling financial institution.

FIG. 4D is an output display example of the on-vehicle information terminal apparatus 20 according to the embodiment 5, namely such an output display example of a comparison result of the authorized user discrimination information such as an ID number and a secret number.

Next, a description will now be made of operations of the on-vehicle information terminal apparatus 20 according to the embodiment 5.

In FIG. 12, first, either the personal discrimination information or the authorized user discrimination information such as the previously set secret number are read out from the access code storage unit 22 to be saved in the authorized user discriminating unit 114 (step 121).

While the remote control key 110 is operated, the authorized user discrimination information transmitted via the security signal communicating unit 112 from the authorized user discrimination signal transmitting unit 111 is received by the security signal communicating unit 113 provided on the side of the on-vehicle information terminal apparatus 20 (step 122). Next, the authorized user discriminating unit 114 judges as to whether or not the entered user corresponds to the authorized user by being compared with the authorized user discrimination information received on the side of the on-vehicle information terminal apparatus 20 (step 123). If the entered user corresponds to the authorized user, then the authorized user discriminating unit 114 allows reading of the access code with respect to the access code storage unit 22 (step 124). In this case, for example, such a display content as shown in FIG. 4D may be outputted to the comparison result outputting unit 27. To the contrary, when the entered user is not equal to the authorized user, the authorized user discriminating unit 114 prohibits reading of the access code (step 125).

In accordance with the embodiment 5, the on-vehicle information terminal apparatus 20 is provided with the remote control key 110 for inputting the authorized user discrimination information used to specify the user and also the authorized user discriminating unit 114 for judging as to whether or not the entered user corresponds to the authorized user based upon the entered authorized user discrimination information. As a result, it is possible to avoid unfair use by any persons other than the authorized user.

Also, in accordance with the on-vehicle information terminal apparatus 20 of the embodiment 5, since the remote control key 110 utilizes the remote control operation by way of the wireless communication, it is possible to firmly avoid unfair use by other persons who do not own the remote control key 110.

Embodiment 6

Figure 13:
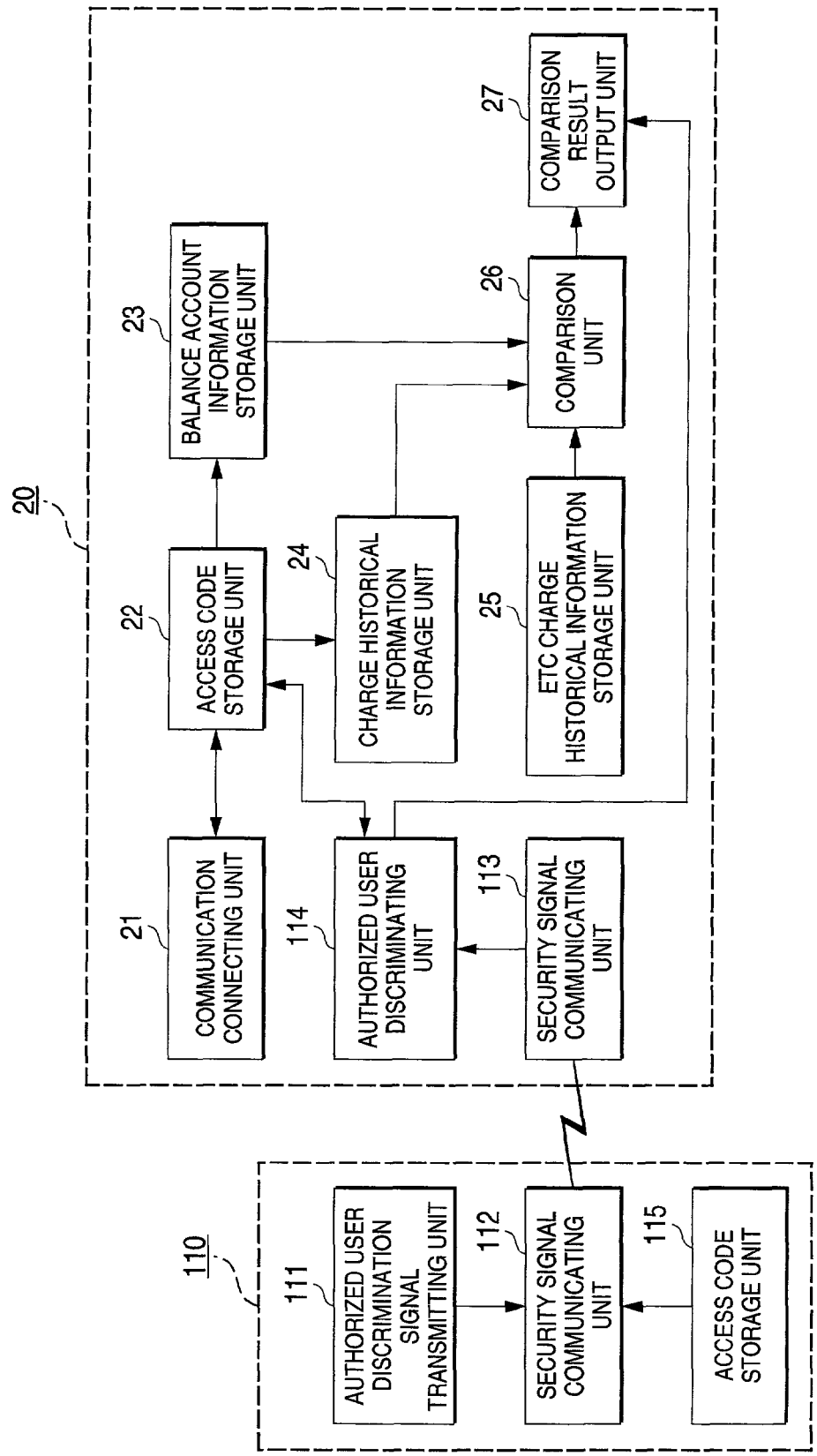
FIG. 13 is a functional structural block diagram of an on-vehicle information terminal apparatus according to an embodiment 6 of the present invention.

FIG. 13 is a functional block diagram for indicating an arrangement of an on-vehicle information terminal apparatus 20 according to an embodiment 6 of the present invention. In this case, an access code storage unit 115 is contained in the remote control key 110. The access code storage unit 115 stores thereinto personal discrimination information and access codes used to access the server 14 of the credit card firm and the server 14 of the settling financial institution, which corresponds to second identification information used to specify a user. Other structural units of the embodiment 6 are similar to those of the embodiment 5 shown in FIG. 11.

Figure 14:
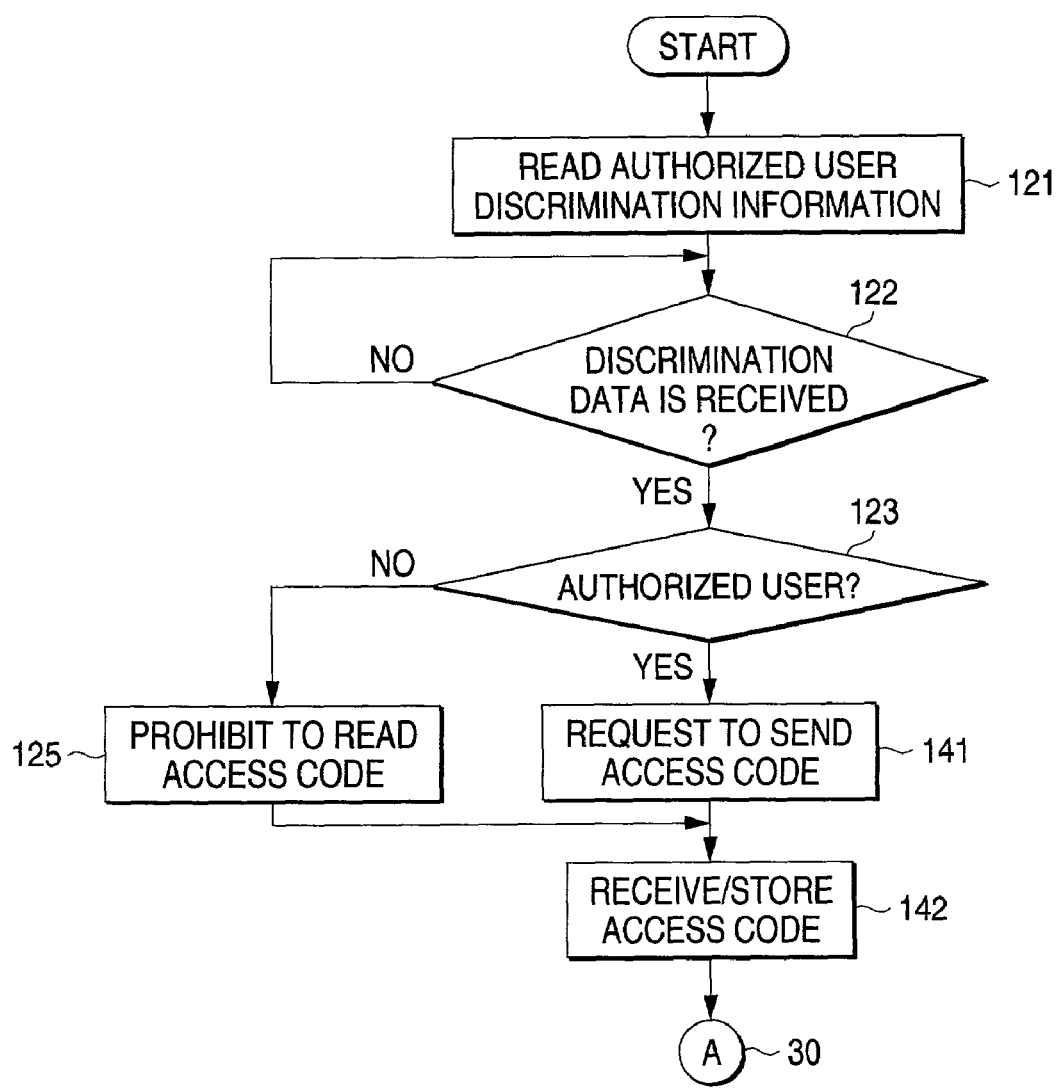
FIG. 14 is an operation flow chart for explaining operations of the on-vehicle information terminal apparatus according to the embodiment 6 of the present invention.

FIG. 14 is an operation flow chart for describing operations of the on-vehicle information terminal apparatus 20 according to the embodiment 6. In this flow chart, a step 141 indicates a process for requesting to send the personal discrimination information and the access codes used to access the server 14 of the credit card firm and also the server 14 of the settling financial institution. A step 142 indicates a process for receiving/storing the personal discrimination information and the server 14 of the credit card firm and the server 14 of the settling financial institution.

The above-explained process operations are added before the respective process operations employed in the embodiment 1 to the embodiment 4 as represented in FIGS. 3, 6, 8, and 10 as such a process operation capable of judging as to whether or not reading of the personal discrimination information and the access code are allowed. This access code is used to access the servers 14 of both the credit card firm and the settling financial institution.

Next, a description will now be made of operations of the on-vehicle information terminal apparatus 20 according to the embodiment 6.

In FIG. 14, in an authorized user judging process (step 123) similar to that of the embodiment 5 shown in FIG. 12, in such a case that the authorized user discriminating unit 114 confirms that the entered user is the authorized user, the on-vehicle information terminal apparatus 20 requests to transmit the personal discrimination information and the access codes used to access the servers 14 of the credit card firm and the settling financial institution via the security signal communicating unit 112 (step 141).

The remote control key 110 which receives via the security signal communicating unit 112 the transmission request of the personal discrimination information and also the access codes used to access the servers 14 of the credit card firm/settling financial institution reads both the personal discrimination information and the access codes for accessing the servers 14 of the credit card firm/settling financial institution from the access code storage unit 115. Again, the remote control key 110 transmits the read personal discrimination information and also the read access codes via the security signal communicating unit 112 to the on-vehicle information terminal apparatus 20.

The on-vehicle information terminal apparatus 20 which receives via the security signal communicating unit 113 the transmission request of the personal discrimination information and also the access codes used to access the servers 14 of the credit card firm/settling financial institution stores both the personal discrimination information and the access codes into the access code storage unit 22 (step 142). When accessing the servers 14 of the credit card firm/settling financial institution, this on-vehicle information terminal apparatus 20 uses these stored personal discrimination information/access codes. After the access operation is accomplished, since the storage content of the access code storage unit 22 is cleared, it is possible to avoid such an unfair access made by any other persons than the authorized user.

It should be noted that the remote control operation functions by the remote control key 110 employed in the embodiments 5 and 6 may be modified. For example, the taste information of the user as described in the embodiments 3 and 4 may be transmitted/received between the remote control key 110 and the on-vehicle information terminal apparatus 20. In accordance with the alternative arrangement, the taste information of the user may be more simply backed up and/or restored.

In accordance with the on-vehicle information terminal apparatus 20 of the embodiment 6, since the remote control key 110 is employed so as to input the access codes, it is possible to avoid such an unfair access to the servers 14 by any other persons than the authorized person. These access codes are transmitted by the communication connecting unit 21 to the server 14 of the credit card firm and also the server 14 of the settling financial institution.

Embodiment 7

Figure 15:
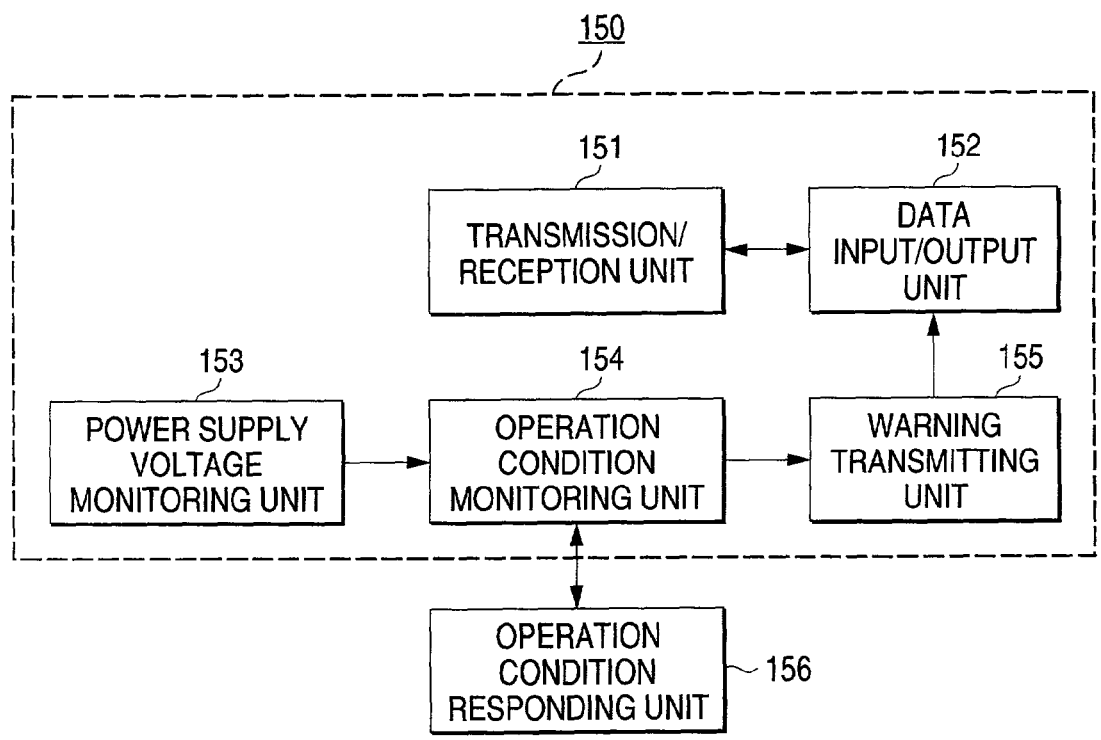
FIG. 15 is a functional structural block diagram for showing a communication connecting unit of an on-vehicle information terminal apparatus according to an embodiment 7 of the present invention.

FIG. 15 is a functional block diagram for representing an arrangement of an on-vehicle information terminal apparatus 20 according to an embodiment 7 of the present invention. In this drawing, reference numeral 150 shows a communication appliance such as an automobile telephone and a portable telephone. This communication appliance 150 contains an independently operable battery power source, and is connected to a main body of the on-vehicle information terminal apparatus 20. FIG. 15 indicates a detailed internal arrangement of the communication connecting unit 12 shown in each of the functional structural block diagrams of the embodiment 1 to the embodiment 6 indicated in FIGS. 2, 5, 7, 9, 11, and 13. Also, reference numeral 151 denotes a transmission/reception unit for communicating with an external appliance. Reference numeral 152 shows a data input/output unit which is interfaced with the access code storage unit 22 employed in the embodiments 1 to 6. Reference numeral 153 represents a power supply voltage monitoring unit for monitoring a power supply voltage of the communication appliance 150. Reference numeral 154 shows an operation condition monitoring unit functioning as a monitoring means for monitoring as whether or not the communication function can be used. Also, reference numeral 155 denotes a warning transmitting unit functioning as a warning means. This warning means produces a warning notice by buzzer sounds with respect to whether or not the communication function can be used, and furthermore, transmits such a warning notice via the data input/output unit 152 and the transmission/reception unit 151 to such an external destination as a home of a user and a security company. Reference numeral 156 indicates an operation condition responding unit for responding a connection condition between the communication appliance 150 and the own unit 156 provided on the side of the main body of the on-vehicle information terminal apparatus 20.

Figure 16:
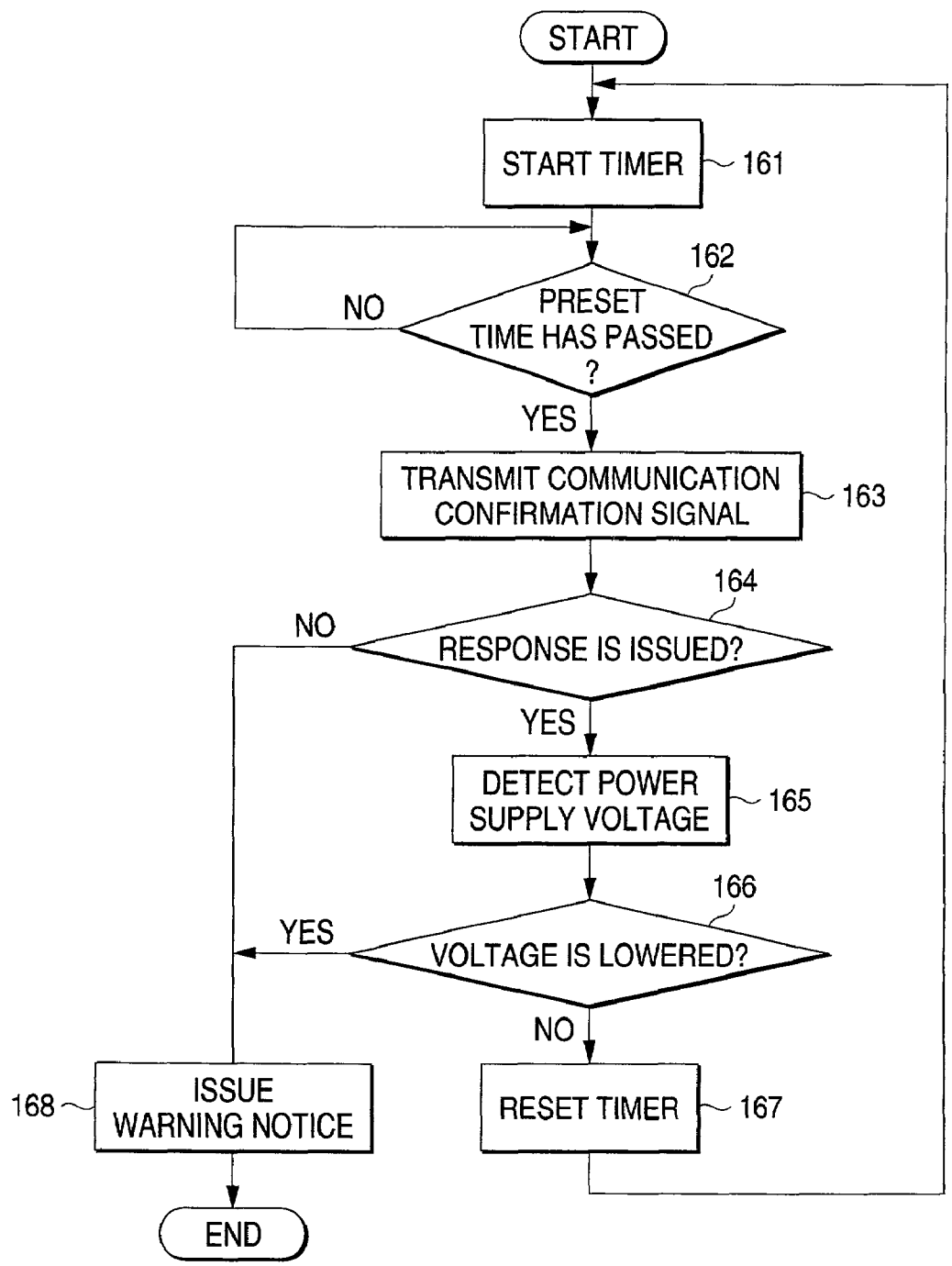
FIG. 16 is a communication function operation condition monitoring flow chart of the communication connecting unit of the on-vehicle information terminal apparatus according to the embodiment 7 of the present invention.

FIG. 16 is a flow chart for describing a communication function operating condition monitoring process as to the communication connecting unit 21 of the on-vehicle information terminal apparatus 20 according to the embodiment 7. In this flow chart, a step 161 shows a monitoring period timer start process, a step 162 indicates a process for confirming elapse time of a monitoring period timer. A step 163 denotes a process for transmitting a connection condition monitoring communication confirmation signal. A step 164 represents a response confirmation process with respect to the communication confirmation signal. A step 165 corresponds to a power supply voltage detection process. A step 166 represents a process for judging a power supply voltage lowering condition. A step 167 indicates a monitoring period timer reset process. A step 168 represents a warning transmission process with respect to whether or not the communication function can be used.

Next, a description will now be made of operations of the communication connecting unit 21 employed in the on-vehicle information terminal apparatus 20.

In a flow chart of FIG. 16, the operation condition monitoring unit 154 of the communication appliance 150 starts the monitoring period timer (step 161). When preset time has elapsed (step 162), the operation condition monitoring unit 154 transmits the connection condition monitoring communication confirmation signal to the operation condition responding unit 156 (step 163).

Upon receipt of the response issued from the operation condition responding unit 156 (step 164), the power supply voltage monitoring unit 153 subsequently detects the voltage of the battery power supply contained in the communication appliance 150 (step 165). When the detected voltage of the battery power supply is lower than, or equal to a predetermined voltage level (step 166), the warning transmitting unit 155 outputs a warning notice of lowering of the battery voltage, and the warning notice is transmitted via the data input/output unit 152 from the transmitting/receiving unit 151 (step 168). When the detected voltage of the battery power supply is higher than, or equal to the predetermined voltage level (step 166), the operation condition monitoring unit 154 resets the monitoring period timer (step 167), and restarts this monitoring period timer (step 161) so as to periodically monitor the operation condition of the communication appliance 150.

Also, when no response is issued from the operation condition responding unit 156 (step 164), the warning transmitting unit 155 outputs such a warning notice which indicates that the communication by the communication appliance 150 cannot is carried out, or the abnormal connection of the communication appliance 150 occurs, and transmits the warning notice via the data input/output unit 152 from the transmission/reception unit 151 (step 168).

In accordance with the on-vehicle information terminal apparatus of the embodiment 7, since the connection connecting unit 21 is comprised of the operation condition monitoring unit 154 for monitoring the operation condition of the communication connecting unit 21 and also the warning transmitting unit 155 for issuing the warning notice in such a case that the operation condition monitoring unit 154 confirms the abnormal operation, the abnormal operation of the communication connecting unit 21 can be informed to the user and the external appliance. As a result, the on-vehicle information terminal apparatus 20 can prevent in advance the problem caused by the abnormal operation.

Embodiment 8

Figure 17:
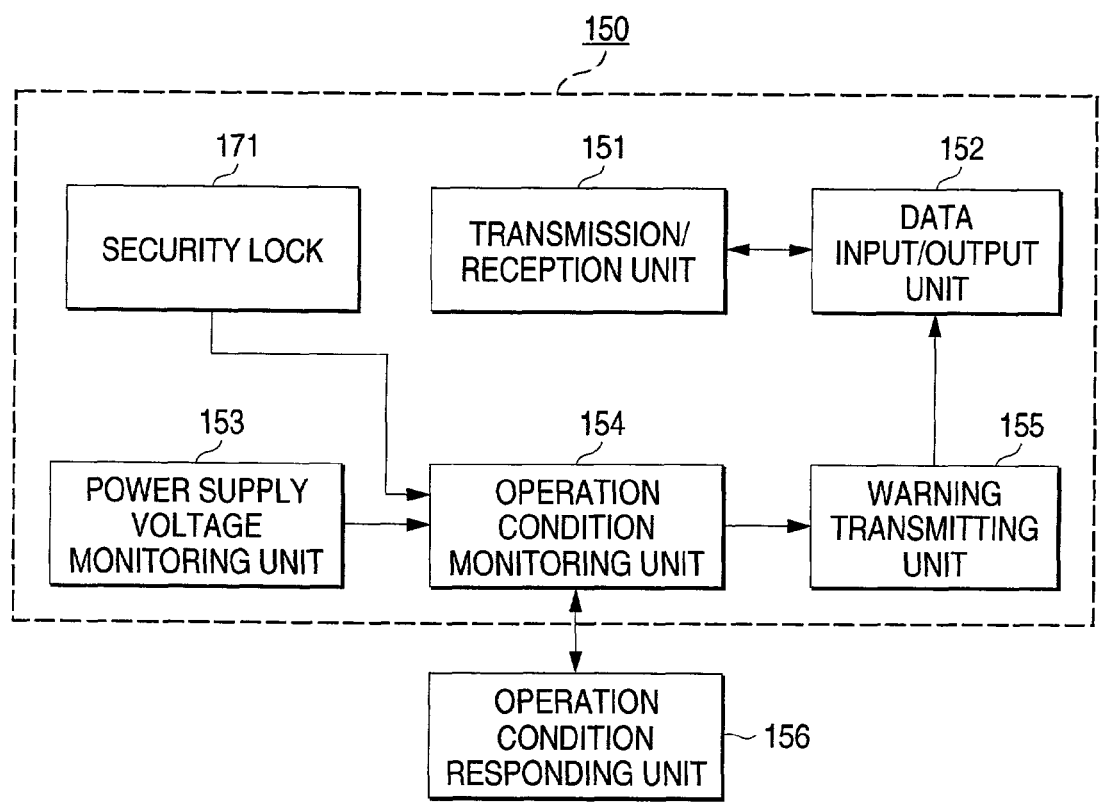
FIG. 17 is a functional structural block diagram for showing a communication connecting unit of an on-vehicle information terminal apparatus according to an embodiment 8 of the present invention.

FIG. 17 is a functional block diagram for indicating an arrangement of an on-vehicle information terminal apparatus 20 according to an embodiment 8 of the present invention. Reference numeral 171 shows a security lock functioning as a releasing means for releasing either the monitoring operation by the operation condition monitoring unit 154 or the warning notice issuing operation by the warning transmitting unit 155. Other structural units of the embodiment 8 are similar to those of the embodiment 7 shown in FIG. 15.

Figure 18:
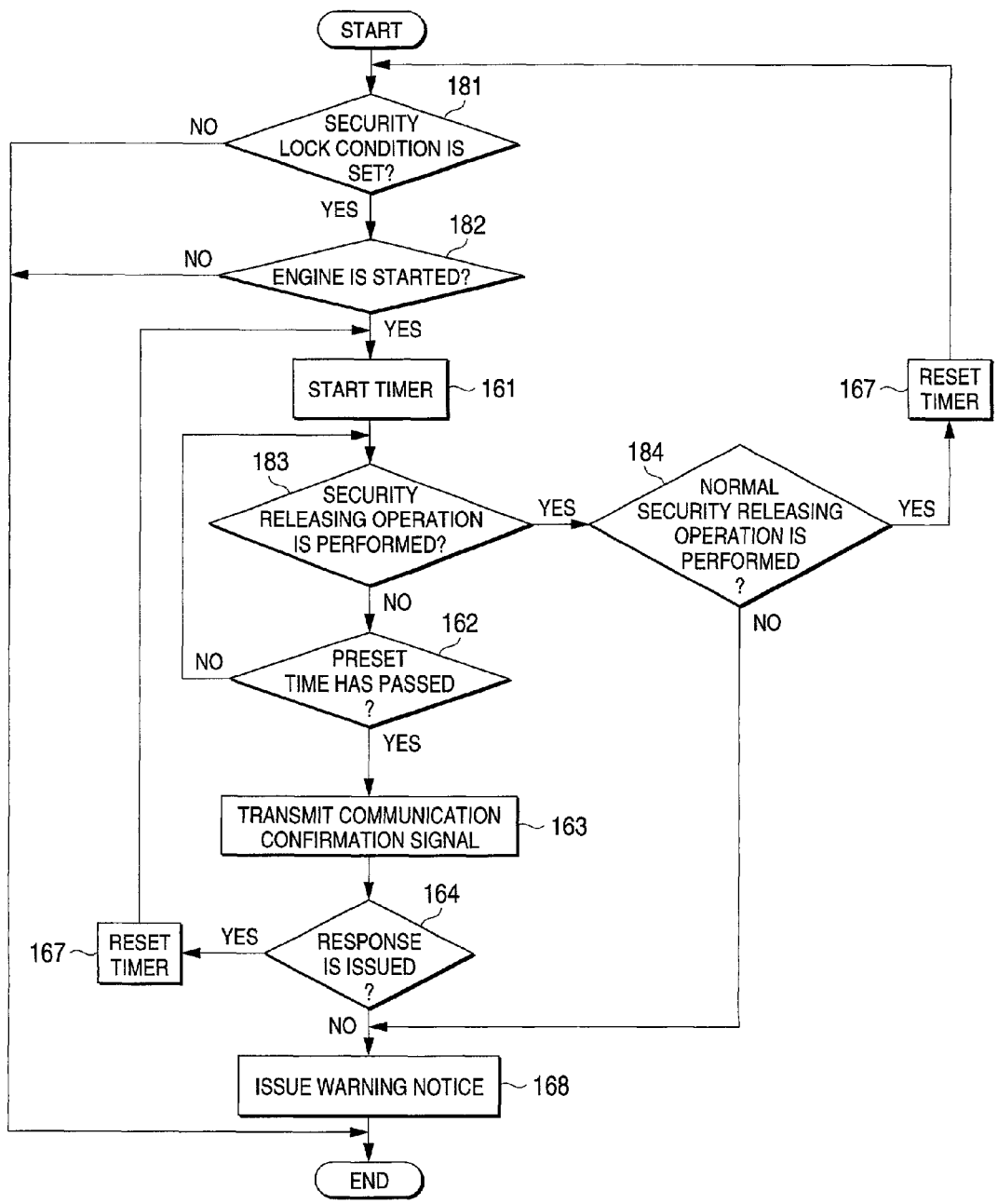
FIG. 18 is a communication function operation condition monitoring flow chart of the communication connecting unit of the on-vehicle information terminal apparatus according to the embodiment 8 of the present invention.

FIG. 18 is a flow chart for describing a communication function operating condition monitoring process as to the communication connecting unit 21 of the on-vehicle information terminal apparatus 20 according to the embodiment 8. In this flow chart, step 181 shows a condition confirming process of the security lock 171. A step 182 shows an engine start confirming process. A step 183 represents a releasing operation sensing process of the security lock 171. A step 184 indicates a normal release confirming process of the security lock 171. Other process steps of this embodiment 8 are similar to those of the embodiment 7 shown in FIG. 16.

The above-explained process operations are added to the communication function operation condition monitoring process of the communication connecting unit of the on-vehicle information terminal apparatus 20 according to the embodiment 7 shown in FIG. 16 as a releasing process operation of the security lock 171 of the communication appliance 150.

Next, a description will now be made of operations of the communication connecting unit 21 employed in the on-vehicle information terminal apparatus 20.

In such a case that the security lock 171 is locked in order to prevent a theft under such a condition that the communication appliance 150 is mounted on the on-vehicle information terminal apparatus 20, this security lock 171 cannot be released unless the following operation is carried out. That is, first, the engine is ignited, and the releasing operation by entering the secret number by manipulating the input key of the communication appliance 150 as the input of the third identification information used to specify the user.

In FIG. 18, when the engine is started at a step 182 under such a condition that the security lock is locked (step 181), the operation condition monitoring unit 154 of the communication appliance 150 starts the monitoring period timer (step 161), and also confirms as to whether or not the releasing operation of the security lock 171 is carried out by entering the secret number by manipulating the input key of the communication appliance 150 (step 183) before the preset time has passed (step 162).

In this case, when the releasing operation is not carried out, similar to the process operations of the embodiment 7 shown in FIG. 16, the operation condition monitoring unit 154 periodically monitors the operation condition of the communication appliance 150 (steps 163, 164, 167). When the abnormal operation happens to occur, the warning transmitting unit 155 outputs such a warning notice as the abnormal connection, and also transmits the warning signal from the transmitting/receiving unit 151 via the data input/output unit 152 (step 168).

In such a case that the releasing operation of the security lock 171 is carried out (step 183), if the releasing operation corresponds to the normal operation by entering the correct secret number (step 184), then the monitoring period timer is reset (step 167), and then the process operation is returned to the condition confirming process of the security lock 171 (step 181). In this case, since the security clock 171 is released, the operation condition monitoring unit 154 does not subsequently monitor the operation condition of the communication appliance 150.

In the case that the releasing operation of the security lock 171 is carried out by entering the unfair or incorrect secret number (step 184), the warning transmitting unit 155 outputs such a warning notice for warning a possibility of a theft, and also transmits a warning signal via the data input/output unit 152 from the transmitting/receiving unit 151 (step 168).

In this case, in order to avoid such an error warning notice made by an erroneous operation by an authorized user, the operation condition monitoring unit 154 may accept plural erroneous operations up to a preselected number until the operation condition monitoring unit 154 judges the abnormal releasing operation of the security lock 171.

In accordance with the on-vehicle information monitoring apparatus 20 of the embodiment 8, since the communication connecting unit 21 is comprised of the security lock 171 for releasing the operation of the operation condition monitoring unit 154, or the warning transmitting unit 155 in response to the input of the secret number used to specify the user, it is possible to avoid such a fact that any other persons than the authorized user unfairly release either the operation of the operation condition monitoring unit 15 or the operation of the warning transmitting unit 155.

Also, in accordance with the on-vehicle information terminal apparatus of the embodiment 8, in such a case that the operation condition monitoring unit 154 confirms the abnormal operation of the communication function under such a condition that the operation of the operation condition monitoring unit 154 is not released by the security lock 171, the warning transmitting unit 155 issues the warning notice. As a consequence, such an unfair action that any other persons than the authorized user unfairly remove the communication connecting unit 21 such as the telephone can be informed to the authorized user and the external appliance. Also, it is possible to avoid in advance the damages caused by the theft and the unfair use.

Also, in accordance with the on-vehicle information terminal apparatus of the embodiment 8, in such a case that the unfair information is entered into the security lock 171 under such a condition that the operation of the operation condition monitoring unit 154 is not released by the security lock 171, the warning transmitting unit 155 issues the warning notice. As a consequence, such an unfair action that any other persons than the authorized user unfairly release either the operation of the operation condition monitoring unit 154 or the operation of the warning transmitting unit 155 can be informed to the authorized user and the external appliance. Also, it is possible to avoid in advance the damages caused by the theft and the unfair use.

Embodiment 9

Figure 19:
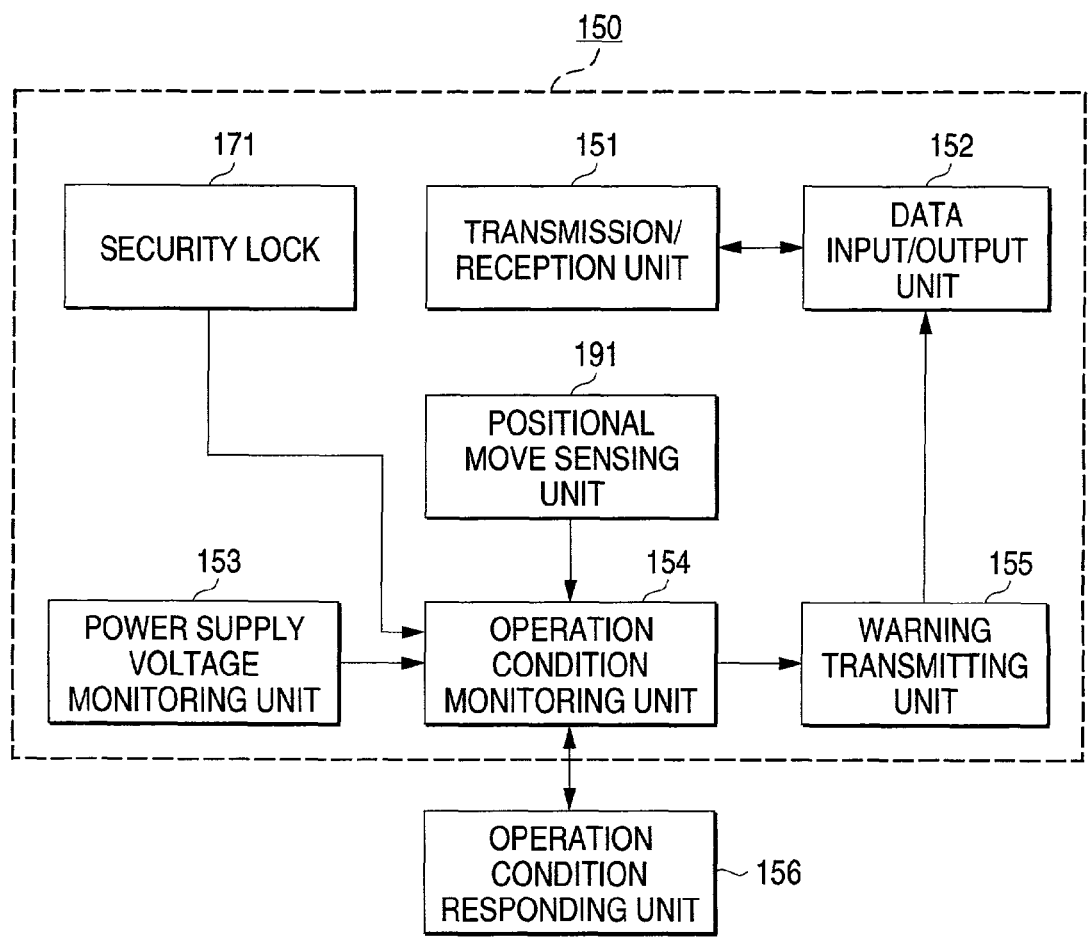
FIG. 19 is a functional structural block diagram for showing a communication connecting unit of an on-vehicle information terminal apparatus according to an embodiment 9 of the present invention.

FIG. 19 is a functional block diagram for indicating a communication connecting unit 21 of an on-vehicle information terminal apparatus 20 according to an embodiment 9 of the present invention. Reference numeral 19 shows a positional move sensing unit functioning as a positional move sensing means for sensing a move of a vehicle position. Other structural units of this on-vehicle information terminal apparatus 20 of the embodiment 9 are similar to those of the embodiment 8 shown in FIG. 17.

Figure 20:
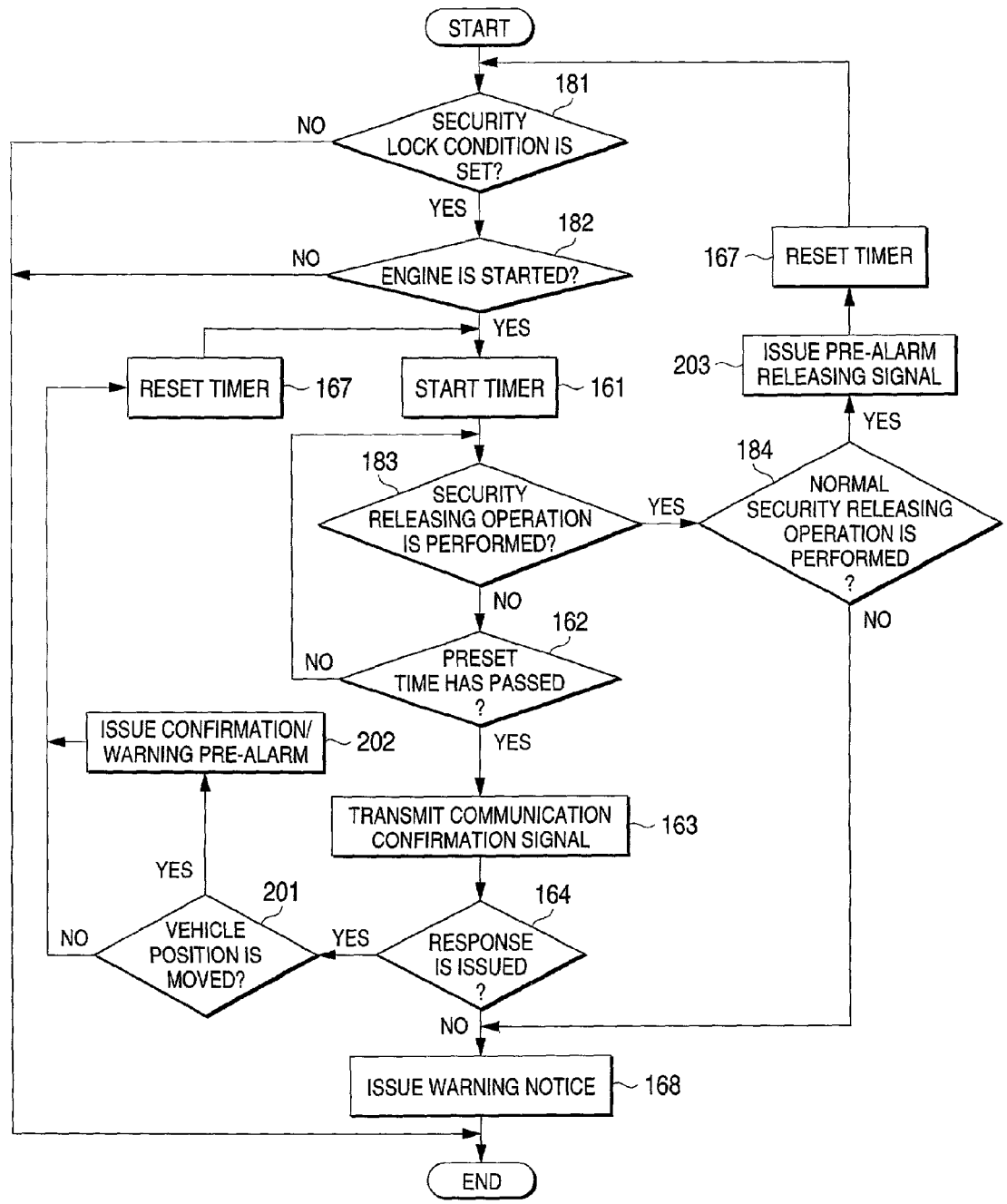
FIG. 20 is a communication function operation condition monitoring flow chart of the communication connecting unit of the on-vehicle information terminal apparatus according to the embodiment 9 of the present invention.

FIG. 20 is an operation flow chart for describing communication function operation condition monitoring of the communication connecting unit 21 of the on-vehicle information terminal apparatus 20 according to the embodiment 9. In this flow chart, a step 201 indicates a process for sensing a vehicle position move. A step 202 represents a release requesting warning process, or a theft pre-alarm process of the security lock 171. A step 203 indicates a process for producing a theft pre-alarm releasing signal. Other steps of this embodiment 9 are similar to those of the embodiment 8 shown in FIG. 18.

Next, the operation of the on-vehicle information terminal apparatus 20 according to the embodiment 9 will now be explained.

In FIG. 20, similar to the communication function operation condition monitoring process operation of the communication connecting unit 21 employed in the on-vehicle information terminal apparatus 20 according to the embodiment 8 shown in FIG. 18, while the security lock 171 is not released (step 181), in such a case that the engine is ignited (step 182) and furthermore, the security lock 171 is not released even after the preset time of the connection condition monitoring period timer employed in the communication appliance 150 has elapsed (step 161, 183, and 162), the communication connecting unit 21 transmits the connection condition monitoring communication confirmation signal to the operation condition responding unit 156 (step 163).

In this case, when the response is sent from the operation condition responding unit 156 (step 164), the positional move sensing unit 191 senses as to whether or not the position of the vehicle 11 is moved (step 201).

As this positional move sensing unit 191, there are such sensors capable of sensing positional moves by utilizing a vehicle speed signal and an acceleration speed sensor employed in the vehicle 11. Alternatively, this positional move sensing unit 191 may be realized by such sensors. That is, while a GPS (Global Positioning System) receiver is contained in the communication appliance 150, the positional move of the vehicle may be sensed. Also, while positional information is acquired from a navigation system, the positional move of the own vehicle is sensed. In this case, while the positional information acquired before the engine is stopped, or the periodically acquired positional information are stored, the latest positional information acquired by the own vehicle may be compared with the stored positional information so as to sense the positional move of the own vehicle.

When the position of the vehicle 11 is not moved, the monitoring period timer is reset (step 167), and then, this monitoring period timer is restarted (step 161). To the contrary, when the position of the vehicle 11 is moved, the warning notice for requesting the release of this security lock 171. Otherwise, such a pre-alarm notice indicating a possibility of a theft is issued (step 202). Thereafter, the monitoring period timer is reset (step 167), and then, the monitoring period timer is again started (step 161).

Alternatively, when such a warning notice is issued, both the registration information about the vehicle 11 and the own vehicle positional information, which are acquired from the navigation system, may be issued at the same time. As a result, since both the vehicle registration information and the vehicle position can be informed to the external appliance, the damages caused by the theft and the unfair use can be more firmly prevented.

On the other hand, in the case that the releasing operation of the security lock 171 is carried out within the setting time of the monitoring period timer (step 183), if this releasing operation corresponds to the normal operation (step 184), and the warning notice for requesting the releasing operation of the security lock 171 has already been issued, or the pre-alarm indicative of the possibility of the theft has already been issued, then such a signal for releasing this security lock is issued (step 203). Next, the monitoring period timer is reset (step 167), and then the process operation is returned to the process for confirming the security lock 171 (step 181). In this case, since the security lock 171 is released, the operation condition monitoring unit 154 does not subsequently monitor the operation condition of the communication appliance 150.

In such a case that the abnormal releasing operation of the security lock 171 is carried out (step 184), the warning transmitting unit 155 transmits such a warning notice for warning the possibility at which the theft occurs (step 168).

In this case, in order to avoid such an error warning notice made by an erroneous operation by an authorized user, the operation condition monitoring unit 154 may accept plural erroneous operations up to preselected number until the operation condition monitoring unit 154 judges the abnormal releasing operation of the security lock 171.

In accordance with the on-vehicle information terminal apparatus 20 of the embodiment 9, the communication connecting unit 21 is provided with the positional move sensing unit 191 for sensing the positional move of the communication connecting unit 21. In the case that the operation condition monitoring unit 154 confirms the positional move sensed by the positional move sensing unit 191 under such a condition that the operation of the operation condition monitoring unit 154 is not released by the security lock 171, the warning transmitting unit 155 produces the warning notice. As a result, such a fact that any other persons than the authorized user unfairly move the communication connecting unit 21, the on-vehicle information terminal apparatus 20, or the vehicle 11 can be informed to the authorized user and/or the external appliance. Therefore, it is possible to prevent in advance the damages caused by the theft and the unfair use.

It should be understood that the above-explained embodiments 1 to 9 have described such an example of the on-vehicle information terminal apparatus 20 which is mounted on the vehicle 11 corresponding to the mobile object. Alternatively, the present invention may be applied to a portable information terminal apparatus being portable by a user, and/or an information terminal apparatus installed in an office. Even in such an alternative case, a similar effect may be achieved.

As previously described in detail, since the on-vehicle information terminal apparatus of the present invention is constituted by employing the above-explained arrangement, the below-mentioned effects can be achieved.

In accordance with the information terminal apparatus of the present invention, this information terminal apparatus is comprised of: the communication means for transmitting/receiving the information among the own communication means, the server of the credit card firm, and the server owned by the settling financial institution which settles the charge requested from the credit card firm; the processing means for executing the comparison process as to both the credit card charge historical information issued from the credit card firm and the balance account information saved in the settling financial institution, the credit card charge historical information being contained in the transmission/reception information of the communication means; and the output means for outputting the predetermined information based upon the comparison process result by the processing means. Since such information as to a shortage of the balance amount of the bank account can be informed in advance to the user, there is such an advantage that the highly-reliable information terminal apparatus with comfortability can be obtained by avoiding in advance the occurrence of the non-settlement problem due to a shortage of the balance amount of the bank account.

Also, in accordance with the information terminal apparatus of the present invention, the processing means is comprised of: the periodic charge information extracting means for extracting the periodic charge information from the credit card charge historical information; and the prediction means for predicting the estimated charge amount based on the extracted periodic charge information; and the processing means executes the comparison process as to the credit card charge historical information containing the estimated charge amount and the balance account information. Since such information that a shortage of the balance amount of the bank account may be expected can be informed in advanced to the user, there is a merit that the high-reliable information terminal apparatus with comfortability can be obtained by avoiding in advance the occurrence of non-settlement problem due to a shortage of the balance amount of the bank account.

Also, in accordance with the information terminal apparatus of the present invention, the processing means is comprised of: the taste information extracting means for extracting the taste information of the user upon the shop use historical information, the facilities use historical information, or the shopping historical information, which are contained in the credit card charge historical information; and the providing means for providing the taste information with a top priority while the shop or the facilities are retrieved. As a consequence, there is such an effect that the information fitted to the user taste can be quickly provided.

Also, in accordance with the information terminal apparatus of the present invention, this information terminal apparatus is further comprised of: the storage means for storing thereinto the taste information extracted by the taste information extracting means. As a result, there is such an effect that when the information terminal apparatus is updated, the taste information can be reused without being lost.

Also, in accordance with the information terminal apparatus of the present invention, the storage means is constituted by the non-volatile storage medium; and the storage means is arranged in such a manner that the taste information can be replaced with respect to the external appliance, while the storage means is detachably mounted on the information terminal apparatus, or is communicated to the external appliance. As a result, there is such an effect that when the information terminal apparatus is updated, the taste information can be easily reused without being lost.

Also, in accordance with the information terminal apparatus of the present invention; this information terminal apparatus is further comprised of: the input means for inputting the first identification information used to specify the user; and the identifying means for judging as to whether or not the user can use the credit card based upon the first identification information entered by the input means. As a result, there is such an effect that the unfair use by any other persons than the user can be prevented.

Also, in accordance with the information terminal apparatus of the present invention, the input means utilizes the remote control operation by way of the wireless communication. As a result, there is such an effect that the unfair use by any other persons than the user can be firmly prevented, who do not own the appliance equipped with the remote control operation.

Also, in accordance with the information terminal apparatus of the present invention, the input means inputs the second identification information which is transmitted from the communication means to both the credit card firm and the server of the settling financial institution so as to identify the user. As a result, there is such an effect that the unfair access to the above-explained servers by any other persons than the user can be avoided.

Also, in accordance with the information terminal apparatus of the present invention, the communication means is comprised of: the monitoring means for monitoring the operation conditions of the communication means; and the warning means for issuing the warning notice in the case that the abnormal operation is confirmed by the monitoring means. As a result, there is such a merit that since the abnormal operation of the communication means can be informed to the user and the external appliance, the problem caused by such an abnormal operation can be avoided in advance.

Also, in accordance with the information terminal apparatus of the present invention, the communication means is comprised of: the releasing means for releasing the operation of either the monitoring means or the warning means by inputting thereinto the third identification information used to identify the user. As a result, there is an effect that it is possible to avoid such a fact that any other persons than the user unfairly release either the operation of the monitoring means or the operation of the warning means.

Also, in accordance with the information terminal apparatus of the present invention, in such the case that the monitoring means confirms the abnormal operation of the communication function under such the state that the operation of the monitoring means is not released by the releasing means, the warning notice is issued by the warning means. As a result, there is an effect that since such a fact that any other persons than the user try to unfairly remove the communication means can be informed to the user and the external appliance, the damage caused by the theft and the unfair use can be avoided in advance.

Also, in accordance with the information terminal apparatus of the present invention, the communication means is further comprised of: the positional move sensing means for sensing the positional move of the communication means; and in such the case that the monitoring means confirms the abnormal operation of the communication function under such the state that the operation of the monitoring means is not released by the releasing means, the warning notice is issued by the warning means. As a consequence, the following effect can be achieved. That is, such a fact that any other persons that the user try to unfairly move the communication means, the information terminal apparatus, or the mobile object which mounts thereon the information terminal apparatus can be informed to the user and the external appliance, so that the damages caused by the theft and the unfair use can be avoided in advance.

Also, in accordance with the information terminal apparatus of the present invention, in such the case that the unfair information is entered into the releasing means under such the state that the operation of the monitoring means is not released by the releasing means, the warning notice is issued by the warning means. As a result, the following effect can be achieved. That is, such a fact that any other persons than the user try to unfairly release either the operation of the monitoring means or the operation of the warning means can be informed to the user and the external appliance, so that the damages caused by the theft and the unfair use can be avoided in advance.

Also, in accordance with the information terminal apparatus of the present invention, this information terminal apparatus is mounted on the mobile object; and the processing means executes the comparison process as to the toll road fee historical information supplied from the electric toll collection system, the credit card charge historical information, and the balance account information. Since such a fact that the information as to a shortage of the balance amount of the bank account produced by considering the toll road fee historical information is informed to the user in advance, the following effects can be achieved. That is, the occurrence of the non-settlement due to a shortage of the balance amount of the bank account can be avoided in advance, and also the highly-reliable information terminal apparatus with comfortability for the mobile object can be obtained.

Also, in accordance with the information terminal apparatus of the present invention, this information terminal apparatus is mounted on the mobile object; and the processing means is comprised of: the taste information extracting means for extracting the taste information of the user based upon either the shopping historical information or the shop and/or facilities use historical information, which are contained in the credit card charge historical information, and also the travel path historical information supplied from the credit card charge historical information; and the providing means for providing the taste information with a top priority while the shop, the facilities, or the route is sought. As a consequence, there is such an advantage that the information fitted to the taste of the user in the mobile object can be quickly provided.

What is claimed is:

1. An information terminal apparatus comprising:
   communication unit configured to transmit and receive information among said communication unit, a server of a credit card firm, and a server owned by a settling financial institution which settles a charge requested from said credit card firm;
   processing unit configured to execute a comparison process as to both credit card charge historical information issued from said credit card firm and balance account information saved in said settling financial institution, said credit card charge historical information being contained in the transmission and reception information of said communication unit; and
   output unit configured to output comparison result information based upon the comparison process result by the processing unit.

2. An information terminal apparatus as claimed in claim 1 wherein: said processing unit comprises periodic charge information extracting unit configured to extract periodic charge information from the credit card charge historical information;
   prediction unit configured to predict an estimated charge amount based on said extracted periodic charge information; and
   said processing unit executes the comparison process as to said credit card charge historical information containing said estimated charge amount and said balance account information.

3. An information terminal apparatus as claimed in claim 1 wherein: said processing unit comprises:
   taste information extracting unit configured to extract taste information of a user based upon shop use historical information, facilities use historical information, or shopping historical information, which are contained in the credit card charge historical information; and
   providing unit configured to provide said taste information with a top priority while one of a shop and facilities are retrieved.

4. An information terminal apparatus as claimed in claim 3 wherein:
   said information terminal apparatus further comprises storage unit configured to store thereinto the taste information extracted by said taste information extracting unit.

5. An information terminal apparatus as claimed in claim 4 wherein said storage unit is constituted by a non-volatile storage medium; and said storage unit is arranged in such a manner that the taste information can be replaced with respect to an external appliance, while said storage unit is detachably mounted on the information terminal apparatus, or is communicated to the external appliance.

6. An information terminal apparatus as claimed in claim 1 wherein:
said information terminal apparatus further comprises:
input unit configured to input first identification information used to specify a user; and
identifying unit configured to judge as to whether or not said user can use the credit card based upon said first identification information entered by said input unit.

7. An information terminal apparatus as claimed in claim 6 wherein:
said input unit utilizes a remote control operation by way of a wireless communication.

8. An information terminal apparatus as claimed in claim 6 wherein:
said input unit inputs second identification information which is transmitted from the communication unit to both the credit card firm and the server of the settling financial institution so as to identify the user.

9. An information terminal apparatus as claimed in claim 1 wherein:
said communication unit is comprised of:
monitoring unit configured to monitor operation conditions of said communication unit; and
warning unit configured to issue a warning notice in the case that an abnormal operation is confirmed by said monitoring means.

10. An information terminal apparatus as claimed in claim 9 wherein:
said communication unit comprises:
releasing unit configured to release the operation of either said monitoring unit or said warning unit by inputting thereinto third identification information used to identify the user.

11. An information terminal apparatus as claimed in claim 10 wherein when said monitoring unit confirms the abnormal operation of the communication function under such a state that the operation of said monitoring unit is not released by the releasing unit, the warning notice is issued by said warning unit.

12. An information terminal apparatus as claimed in claim 10 wherein: said communication unit is further comprised of:
positional move sensing unit configured to sense a positional move of said communication unit; and
when said monitoring unit confirms the abnormal operation of the communication function under such a state that the operation of said monitoring unit is not released by the releasing unit, the warning notice is issued by said warning unit.

13. An information terminal apparatus as claimed in claim 10, wherein when at least one of unauthorized information and incorrect information is entered into said releasing unit under such a state that the operation of the monitoring unit is not released by the releasing unit, the warning notice is issued by said warning unit.

14. An information terminal apparatus as claimed in claim 1 wherein said information terminal apparatus is mounted on a mobile object; and
said processing unit executes a comparison process as to toll road fee historical information supplied from an electric toll collection system, the credit card charge historical information, and the balance account information.

15. An information terminal apparatus as claimed in claim 1 wherein: said information terminal apparatus is mounted on a mobile object; and
said processing unit comprises:
taste information extracting unit configured to extract taste information of the user based upon either shopping historical information or shop and/or facilities use historical information, which are contained in the credit card charge historical information, and also travel path historical information supplied from the credit card charge historical information; and
providing unit configured to provide said taste information with a top priority while one of a shop, facilities, and a route is sought.

* * * * *